United States Patent
Howard et al.

(10) Patent No.: US 11,181,727 B2
(45) Date of Patent: Nov. 23, 2021

(54) SUPER-SENSITIVITY MULTIPHOTON FREQUENCY-DOMAIN FLUORESCENCE LIFETIME IMAGING MICROSCOPY

(71) Applicant: UNIVERSITY OF NOTRE DAME DU LAC, South Bend, IN (US)

(72) Inventors: Scott Howard, Notre Dame, IN (US); Genevieve Vigil, South Bend, IN (US); Yide Zhang, South Bend, IN (US)

(73) Assignee: UNIVERSITY OF NOTRE DAME DU LAC, South Bend, IN (US)

( * ) Notice: Subject to any disclaimer, the term of this patent is extended or adjusted under 35 U.S.C. 154(b) by 568 days.

(21) Appl. No.: 16/076,172

(22) PCT Filed: Mar. 10, 2017

(86) PCT No.: PCT/US2017/021819
§ 371 (c)(1),
(2) Date: Aug. 7, 2018

(87) PCT Pub. No.: WO2017/156413
PCT Pub. Date: Sep. 14, 2017

(65) Prior Publication Data
US 2021/0191095 A1   Jun. 24, 2021

Related U.S. Application Data

(60) Provisional application No. 62/306,184, filed on Mar. 10, 2016.

(51) Int. Cl.
*G02B 21/06* (2006.01)
*G02B 21/16* (2006.01)
*G02B 21/36* (2006.01)

(52) U.S. Cl.
CPC ............. *G02B 21/06* (2013.01); *G02B 21/16* (2013.01); *G02B 21/365* (2013.01)

(58) Field of Classification Search
CPC .... G02B 21/0076; G02B 21/16; G02B 5/205; G02B 19/0057; G02B 2027/0138; G02B 27/0172; G02B 6/4296
See application file for complete search history.

(56) References Cited

U.S. PATENT DOCUMENTS 5,759,767 A   6/1998 Lakowicz et al.
6,426,505 B1  7/2002 Rao et al.
(Continued)

FOREIGN PATENT DOCUMENTS

WO    92/13265 A1   8/1992
WO    00/08443 A1   2/2000

OTHER PUBLICATIONS

International Search Report for Application No. PCT/US2017/021819 dated Jun. 13, 2017.

*Primary Examiner* — David P Porta
*Assistant Examiner* — Fani Boosalis
(74) *Attorney, Agent, or Firm* — Tarolli, Sundheim, Covell & Tummino LLP

(57) ABSTRACT

One aspect of the present disclosure relates to systems and methods that can be used for super-sensitivity multiphoton frequency-domain fluorescence lifetime imaging microscopy (MPM-FD-FLIM). One or more laser light sources can deliver excitation light with an intensity modulated by a periodic function to a sample, which includes a fluorophore concentration. A receiver can receive a fluorescence signal emitted from the fluorophore concentration over a time period. A computing device can transform the fluorescence signal to the frequency domain and measure a fluorescence lifetime associated with the sample in the frequency domain based on a DC component and at least one higher harmonic component generated by non-linear optical mixing of the modulated excitation light. Using the DC component and the (Continued)

at least one higher harmonic component can increase the sensitivity of an image created by the MPM-FD-FLIM system.

14 Claims, 16 Drawing Sheets

(56) References Cited

U.S. PATENT DOCUMENTS

| | | | |
|---|---|---|---|
| 7,317,194 B2 | 1/2008 | Atzeni et al. | |
| 2001/0045529 A1* | 11/2001 | Iketaki | G02B 21/16 250/493.1 |
| 2009/0294694 A1* | 12/2009 | Lippert | G02B 21/0076 250/461.1 |
| 2013/0149734 A1* | 6/2013 | Ammar | A61B 3/0008 435/29 |

* cited by examiner

SUPER-SENSITIVITY MULTIPHOTON FREQUENCY-DOMAIN FLUORESCENCE LIFETIME IMAGING MICROSCOPY

RELATED APPLICATIONS

This application claims the benefit of U.S. Provisional Application No. 62/306,184, filed Mar. 10, 2016, entitled "System and Method for Image Resolution in a Multiphoton Microscope," the entirety of which is hereby incorporated by reference for all purposes.

GOVERNMENT FUNDING

This work was supported, at least in part, by grant number CBET-1554516 from the National Science Foundation (NSF). The United States government may have certain rights in this invention.

TECHNICAL FIELD

The present disclosure relates generally to multiphoton frequency-domain fluorescence lifetime imaging microscopy (MPM-FD-FLIM) and, more specifically, to systems and methods for super-sensitivity MPM-FD-FLIM.

BACKGROUND

Multiphoton microscopy (MPM) is a widely used, minimally invasive in vivo imaging technique in biological and medical applications. MPM uses the process of multiphoton (e.g., two or more photon) fluorescence excitation to provide high resolution images with deep penetration, while minimizing the risk of tissue damage. Fluorescence lifetime imaging microscopy (FLIM), which measure the fluorescence decay lifetime of excited fluorophores, can be combined with MPM to form an integrated imaging system. With FLIM, the fluorophore lifetime can be extracted from a signal by either time domain (TD) or frequency domain (FD) techniques. TD techniques obtain the lifetime information by exciting the sample with short optical pulses and measuring the temporal distribution of emission fluorescence, while FD techniques rely on the relative delay of periodic intensity-modulated excitation light to obtain lifetime images. FD techniques are often preferred because of their rapid acquisition speed, easy implementation, and reduced system bandwidth requirements, while eliminating the requirement for short optical pulses needed in TD methods.

An MPM-FD-FLIM system can produce in-vivo lifetime images that possess the advantages of MPM and FD-FLIM, including rapid acquisition, easy implementation, and reduced system bandwidth requirements. However, the MPM-FD-FLIM system is plagued by an imaging sensitivity, or equivalently a signal to noise ratio (SNR) that is too low to study kinetic processes and physiologically relevant structures in biological systems. While the image SNR can be improved by increasing the excitation power, this solution can produce photodamage and fluorophore saturation, among other complications.

SUMMARY

The present disclosure relates generally to multiphoton frequency-domain fluorescence lifetime imaging microscopy (MPM-FD-FLIM) and, more specifically, to systems and methods for super-sensitivity MPM-FD-FLIM. The systems and methods achieve the super-sensitivity by considering a DC component and at least one higher harmonic component generated by non-linear optical mixing of modulated excitation light in a detected fluorescence signal.

In one aspect, the present disclosure can include a system for super-sensitivity MPM-FD-FLIM. The system can include a laser light source to: provide excitation light at an intensity; modulate the intensity of the excitation light according to a periodic function; and deliver the modulated excitation light to a sample that includes a fluorophore concentration. The system can also include a receiver to receive a fluorescence signal emitted from the fluorophore concentration over a time period. The system can also include a computing device comprising: a non-transitory memory storing computer-executable instructions; and a processor that executes the computer-executable instructions to at least: transform the fluorescence signal to the frequency domain; and measure a fluorescence lifetime associated with the sample in the frequency domain based on a DC component and at least one higher harmonic component generated by non-linear optical mixing of the modulated excitation light.

In another aspect, the present disclosure can include a method for detecting for super-sensitivity MPM-FD-FLIM. The method can include delivering, by one or more laser light sources, excitation light with an intensity modulated by a periodic function to a sample that includes a fluorophore concentration. The method can also include receiving, by a receiver, a fluorescence signal emitted from the fluorophore concentration over a time period. The method can also include transforming, by a computing device comprising a processor, the fluorescence signal to the frequency domain; and measuring, by the computing device, a fluorescence lifetime associated with the sample in the frequency domain based on a DC component and at least one higher harmonic component generated by non-linear optical mixing of the modulated excitation light.

BRIEF DESCRIPTION OF THE DRAWINGS

The foregoing and other features of the present disclosure will become apparent to those skilled in the art to which the present disclosure relates upon reading the following description with reference to the accompanying drawings, in which.

DETAILED DESCRIPTION

I. Definitions

Figure 1:
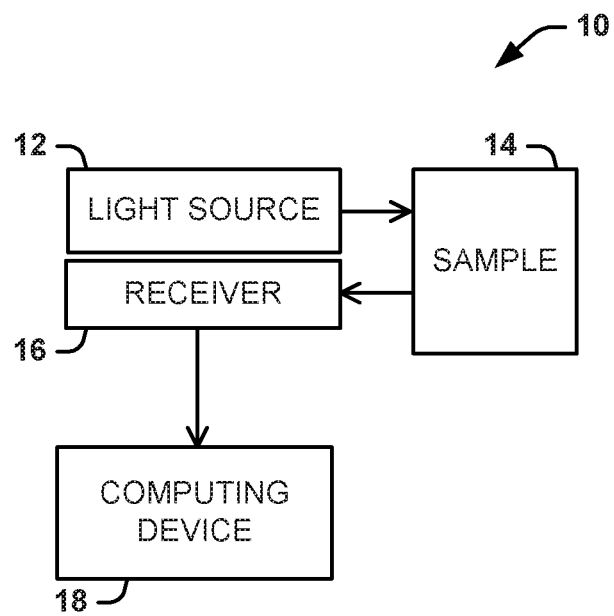
FIG. 1 is a block diagram showing a system that can be used for super-sensitivity multiphoton frequency-domain fluorescence lifetime imaging microscopy (MPM-FD-FLIM) in accordance with an aspect of the present disclosure.

In the context of the present disclosure, the singular forms "a," "an" and "the" can also include the plural forms, unless the context clearly indicates otherwise.

As used herein, the terms "comprises" and/or "comprising" specify the presence of stated features, steps, operations, elements, and/or components, but do not preclude the presence or addition of one or more other features, steps, operations, elements, components, and/or groups.

As used herein, the term "and/or" can include any and all combinations of one or more of the associated listed items.

Although the terms "first," "second," etc. may be used herein to describe various elements, these elements should not be limited by these terms. These terms are only used to distinguish one element from another. Thus, a "first" element discussed below could also be termed a "second" element without departing from the teachings of the present disclosure.

As used herein, the term "multiphoton frequency-domain fluorescence lifetime imaging microscopy" or "MPM-FD-FLIM" can refer to a combination of multiphoton microscopy (MPM) with frequency domain fluorescence lifetime imaging microscopy.

As used herein, the term "multiphoton microscopy" or "MPM" can refer to an imaging technique that utilizes the process of multiphoton fluorescence excitation to provide high resolution with deep tissue depth.

As used herein, the term "fluorescence lifetime imaging microscopy" or "FLIM" can refer to a technique that measures the fluorescence decay lifetime of excited fluorophores.

As used herein, the term "frequency domain" or "FD" when used with FLIM can refer to a technique to obtain the lifetime information relying on the relative decay of periodic intensity modulated excitation light to obtain lifetime images.

As used herein, the term "photoluminescence" can refer to any type of optical excitation by which light is generated in response to excitation of a substance by some other excitation light or electromagnetic radiation. Photoluminescence can include, for example, phosphorescence, electroluminescence, fluorescence, and any optical excitation technique with a finite lifetime.

As used herein, the term "fluorescence" can refer to the emission of light by a substance that has absorbed light or other electromagnetic radiation. However, as used herein, the term fluorescence refers to any type of photoluminescence.

As used herein, the term "sample" can refer to at least a portion of a specimen configured for study with any preparation means necessary for the study or no preparation means at all. For example, the specimen can be prepared with one or more fluorophores.

As used herein, the term "fluorophore" can refer to an imaging probe capable of reemitting light when excited by light. Often, the emitted light is of a different wavelength (e.g., a longer wavelength) than the exciting light.

II. Overview

Information about the microenvironment surrounding living cells is necessary to fundamentally understand biological and medical phenomena, such as aging and disease. A powerful imaging method with the ability to provide such images of the microenvironment surrounding living cells is multiphoton frequency-domain fluorescence lifetime imaging microscopy (MPM-FD-FLIM). However, traditional MPM-FD-FLIM does not possess the sensitivity necessary to study these microenvironments because of photobleaching and saturation.

If excitation power is increased, non-linear effects are seen in a MPM-FD-FLIM signal. Conventionally, these non-linear effects can be used to measure fluorescence lifetime at the fundamental modulation frequency (or first harmonic 1w) and/or at one or more of the higher harmonics (nw). However, the conventional MPM-FD-FLIM systems ignore the important contribution of the DC component. Described herein is super-sensitivity MPM-FD-FLIM imaging, which employs a DC&1w approach to measure the lifetime. The DC&1w approach takes the DC component in addition to the fundamental modulation frequency (1w) and/or one or more of the higher level harmonics (nw) into account when measuring the lifetime. Accordingly, the super-sensitivity MPM-FD-FLIM can possess the sensitivity and/or resolution capabilities to provide quantitative information about the microenvironment surrounding living cells.

III. Systems

One aspect of the present disclosure can include a system 10 (FIG. 1) that can be used for super-sensitivity multiphoton frequency-domain fluorescence lifetime imaging microscopy (MPM-FD-FLIM). For example, the system 10 can include a MPM-FD-FLIM microscope, including at least a light source 12 and a receiver 16, and a computing device 18. The light source 12 can deliver modulated excitation light to a sample according to a periodic function.

The sample can include a concentration of fluorophores that can emit a fluorescence signal in response to the excitation light. The receiver 16 can detect the fluorescence signal and perform preprocessing of the fluorescence signal and deliver the preprocessed fluorescence signal to the computing device 18.

The super-sensitivity can be achieved by computing device 18, which performs a frequency domain analysis of the fluorescence signal and considers the DC components in addition to higher harmonic components (for example, the DC component and the first harmonic (1w) component) generated by non-linear optical mixing of modulated excitation light. The addition of the DC component in the processing improves the signal-to-noise ratio of the microscopy image created based on fluorescence light by a factor of at least two compared to one-photon light microscopy and by a factor of at least four compared to traditional multiphoton microscopy.

Figure 2:
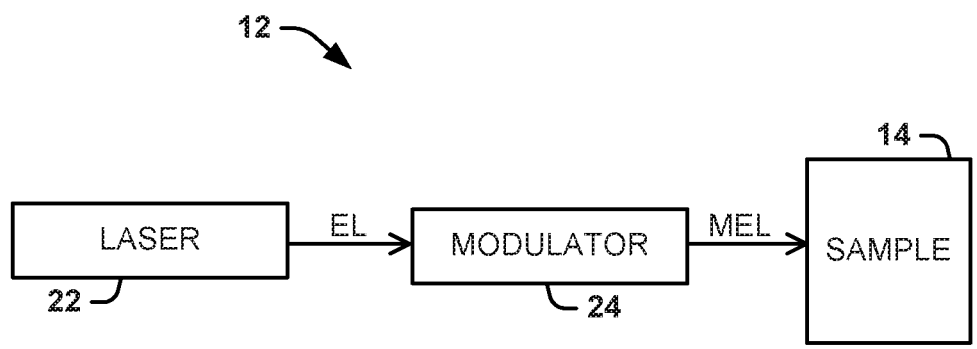
FIG. 2 is a block diagram showing an example of the light source shown in FIG. 1.

An example of the light source 12 is shown in greater detail in FIG. 2. The excitation light (EL) can be provided at an intensity by a laser 22. For example, the laser can be mode-locked to provide the excitation light at the intensity. The laser 22 can provide the excitation light (EL) at a wavelength that is either visible or infrared. Additionally, although a single laser 22 is shown, it will be understood that the light source 12 can include one or more lasers.

The excitation light (EL) can be transmitted to a modulator 24, which modulates the intensity of the excitation light (EL) according to a periodic function (e.g., a sine wave, a square wave, a triangle wave, a dirac comb, or the like). The modulator 24 can be an electro-optic modulator, an acousto-optic modulator, a spatial light modulator, one or more gratings, or the like.

The modulated excitation light (MEL) can be delivered to the sample 14. In some instances, the modulated excitation light can lead to the absorption of at least two photons by the fluorophore within the sample 14. In other instances, the modulated excitation light can lead to the absorption of three or more photons by the fluorophore within sample 14. The fluorophore emits a fluorescence signal upon absorption of two or more photons.

Figure 3:
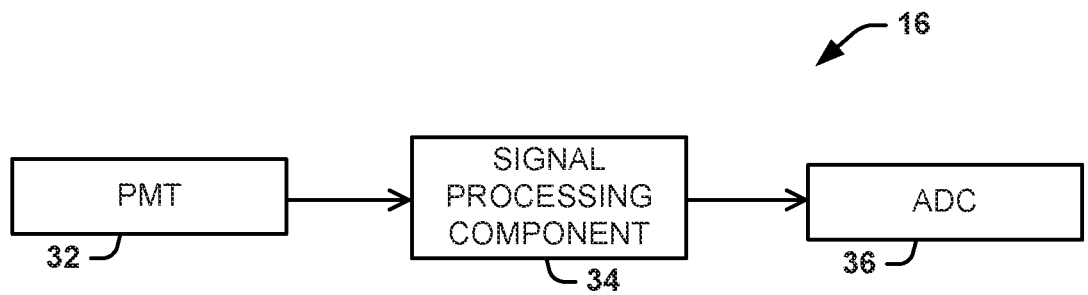
FIG. 3 is a block diagram showing an example of the detector shown in FIG. 1.
Figure 4:
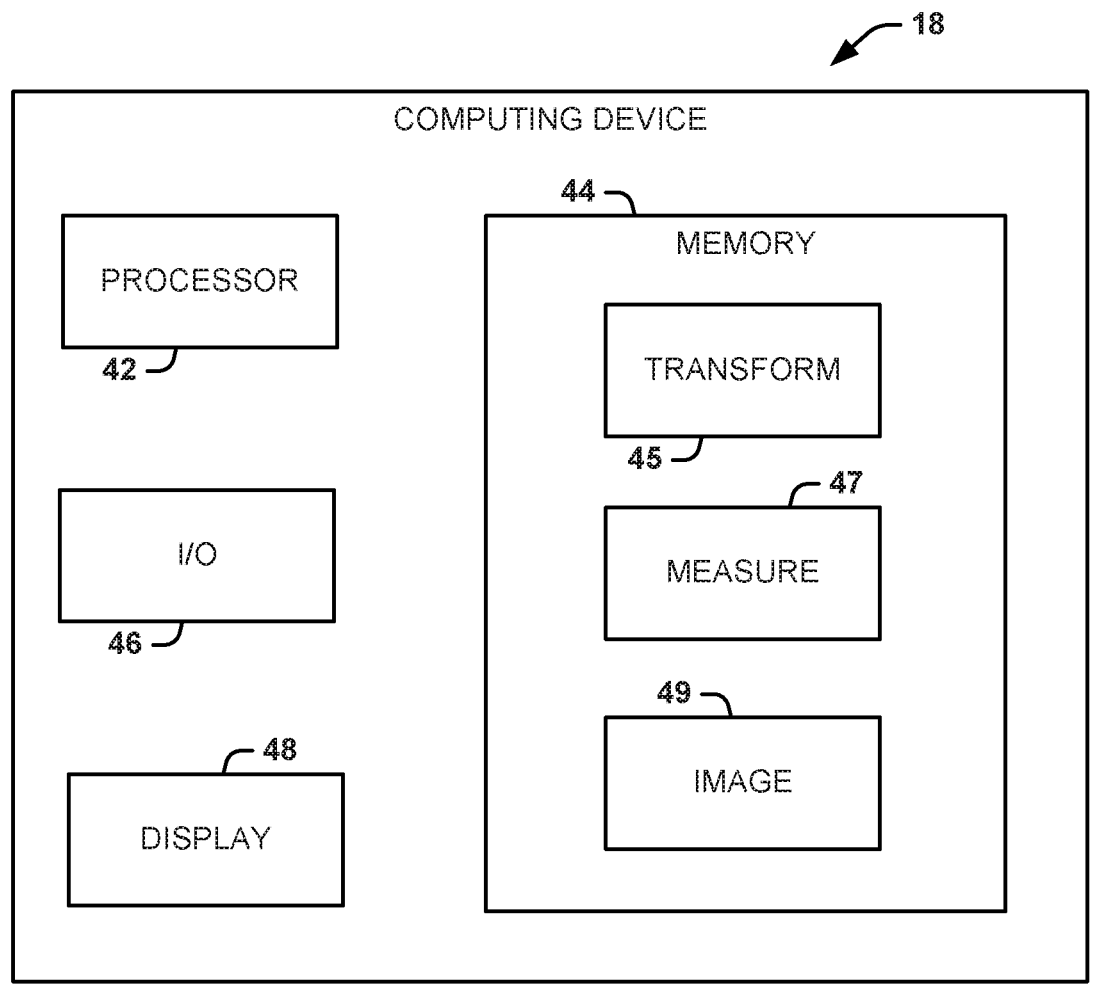
FIG. 4 is a block diagram showing an example of the computing device shown in FIG. 1.

The receiver 16 can receive the fluorescence signal emitted by the fluorophore. The fluorescence signal can be emitted over a time period. An example illustration of the receiver 16 is shown in FIG. 3. The receiver 16 can include a photomultiplier tube (PMT) 32 to collect the fluorescence signal. However, it will be understood that other devices can be used to collect the fluorescence signal, light a semiconductor device, like an avalanche photodiode. Additionally, the receiver 16 can include a signal processing component 34 and an analog to digital convertor (ADC) 36. The signal processing component 34 can include one or more amplifiers and/or filters, such as a low pass filter. The ADC 36 can create a digital signal based on the fluorescence signal.

The digital signal is fed into the computing device 18. An example configuration of the computing device 18 is shown in FIG. 3. The computing device 18 can be any device that includes a non-transitory memory 44 and a processor 42, such as a laptop computer, a desktop computer, a tablet computer, a smart phone, etc.

The computing device 18 receives the digital signal at an I/O component. Data from the digital signal corresponding to the fluorescence detected are saved in the non-transitory memory 44. Additionally, the non-transitory memory 44 has computer program instructions stored therein that can be provided to a processor 42 for execution. The non-transitory memory 44 can include any non-transitory medium that is not a transitory signal, such as, an electronic, magnetic, optical, electromagnetic, infrared, or semiconductor system, apparatus or device. More specific examples (a non-exhaustive list) of the computer-readable storage medium can include the following: a portable computer diskette; a random access memory; a read-only memory; an erasable programmable read-only memory (or Flash memory); and a portable compact disc read-only memory.

For example, the computer program instructions can include transform 45 the fluorescence signal from the time domain to the frequency domain, measure 47 a fluorescence lifetime associated with the sample, and provide an image 49 based on the fluorescence lifetime to the display 48. The processor 42 can execute the computer executable instructions to perform the associated actions. The computing device 18 can measure 47 the fluorescence lifetime associated with the sample based on a DC component and at least one higher harmonic component generated by non-linear optical mixing of the modulated excitation light. For example, the fluorescence lifetime associated with the sample in the frequency domain is measured according to at least one of magnitude components and phase components of the DC component and the at least one higher harmonic component.

The sensitivity can be improved by accounting for the DC component and at least one higher harmonic component. As an example, the DC component and a first harmonic component (1w) can be used to increase the sensitivity. In another example, the DC component, the 1w and the second harmonic component (2w) can be used to increase the sensitivity. In yet another example, the DC component, the 1w, the 2w and the third harmonic component (3w) can be used to increase the sensitivity. In still another example, the DC component, the 1w, the 2w, the 3w and the fourth harmonic component (4w) can be used to increase the sensitivity. In yet another example, the DC component, the 1w, the 2w, the 3w, the 4w, and the fifth harmonic component (w) can be used to increase the sensitivity. Additional harmonics can be used to increase the sensitivity. Additionally, although it may be beneficial to use all of the harmonics below the nth harmonic in the analysis, this is not necessary (for example, the DC component and the 3w can be used without the 1w or 2w).

Improving the sensitivity can include improving the signal to noise ratio (SNR) and/or improving the resolution of the resulting image. To improve the resolution of the resulting image, the modulated excitation signal saturates the signal. Additionally, the image is based on the DC component and at least the first harmonic component and the second harmonic component. However, higher harmonic component may be considered as well (e.g., the third harmonic component, the fourth harmonic component, the fifth harmonic component, etc.). In processing the higher harmonic components (e.g., the second harmonic component or greater), zeroes can be recognized corresponding to nodes encountered during processing. The nodes can correspond to an absence of light at specific excitation irradiances. Recognizing these zeroes can increase the resolution by enabling the higher harmonic component processing, even with a smaller amount of light.

The resolution of the image is improved compared to an image taken with traditional two-photon microscopy. For example, the resolution can be improved by at least a factor of the square root of two compared to traditional multiphoton microscopy images. However, in another example, the resolution can be improved by at least a factor of two compared to traditional multiphoton microscopy images. In a further example, resolution can be improved by at least a factor of ten or more compared to traditional multiphoton microscopy images.

IV. Methods

Figure 5:
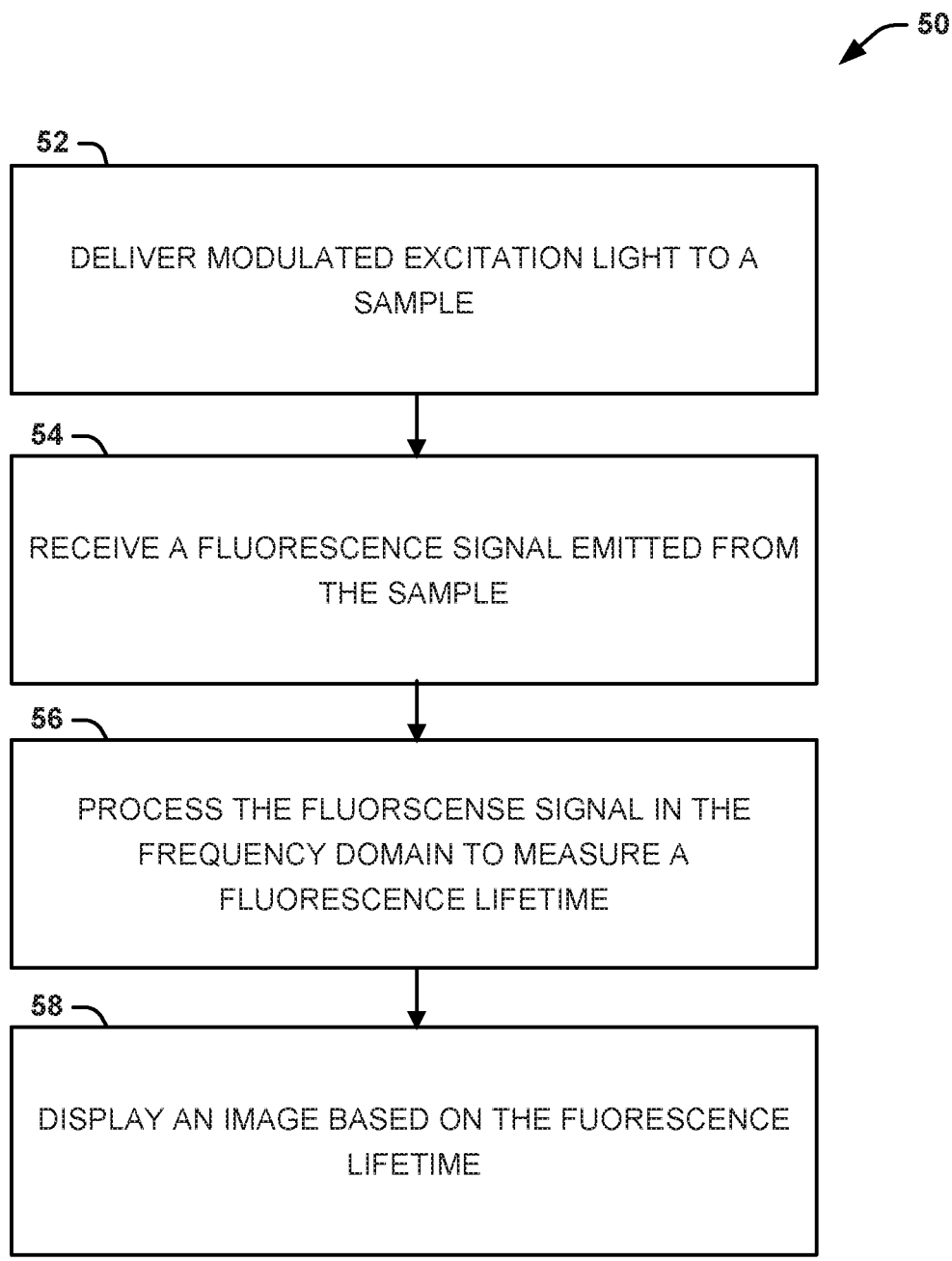
FIG. 5 is a process flow diagram illustrating a method for super-sensitivity MPM-FD-FLIM in accordance with another aspect of the present disclosure.
Figure 6:
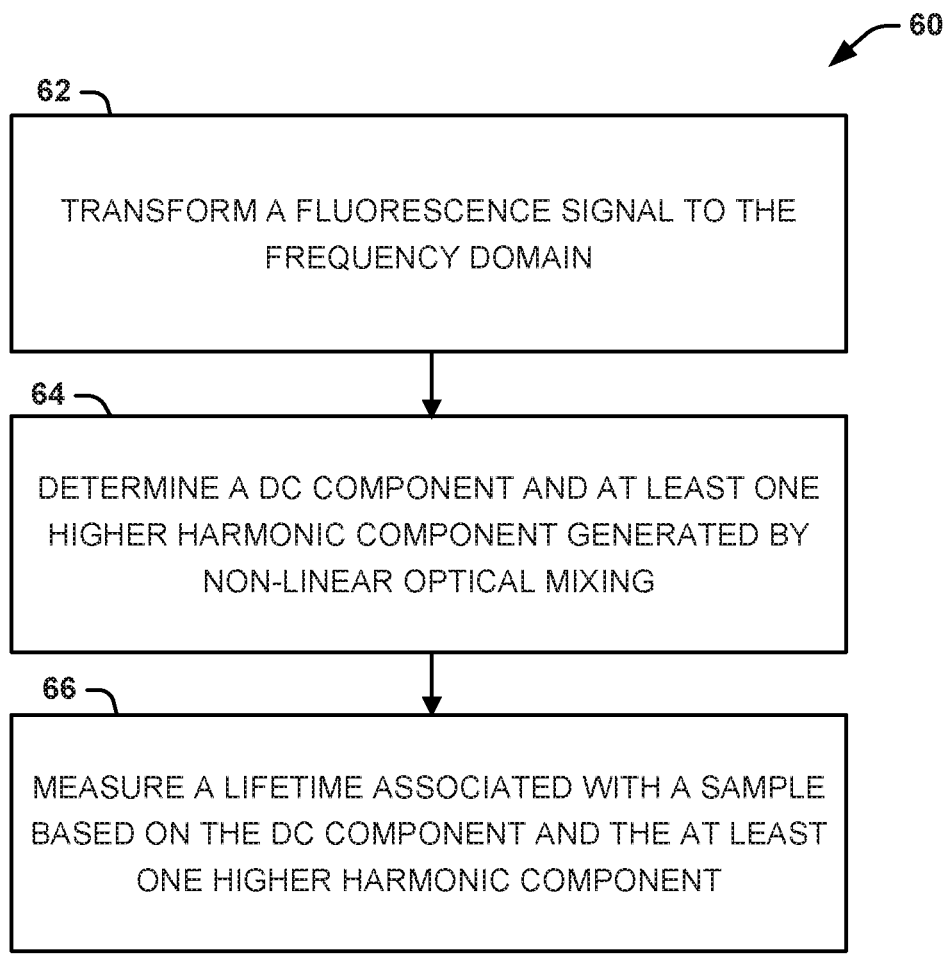
FIG. 6 is a process flow diagram illustrating a method for processing a fluorescence signal in the frequency domain in accordance with the method of FIG. 5.

Another aspect of the present disclosure can include methods 50 and 60 for super-sensitivity MPM-FD-FLIM in accordance with another aspect of the present disclosure, as shown in FIGS. 5 and 6. The methods 50 and 60 of FIGS. 5 and 6, respectively, are illustrated as process flow diagrams with flowchart illustrations. For purposes of simplicity, the methods 50 and 60 are shown and described as being executed serially; however, it is to be understood and appreciated that the present disclosure is not limited by the illustrated order as some steps could occur in different orders and/or concurrently with other steps shown and described herein. Moreover, not all illustrated aspects may be required to implement the methods 50 and 60.

One or more blocks of the respective flowchart illustrations, and combinations of blocks in the block flowchart illustrations, can be implemented by computer program instructions. These computer program instructions can be stored in memory and provided to a processor of a general purpose computer, special purpose computer, and/or other programmable data processing apparatus to produce a machine, such that the instructions, which execute via the processor of the computer and/or other programmable data processing apparatus, create mechanisms for implementing the steps/acts specified in the flowchart blocks and/or the associated description. In other words, the steps/acts can be implemented by a system comprising a processor that can access the computer-executable instructions that are stored in a non-transitory memory.

Referring to FIG. 5, an aspect of the present disclosure can include a method 50 for a method for super-sensitivity MPM-FD-FLIM. The super-sensitivity can be achieved by computing device 18, which performs a frequency domain analysis of the fluorescence signal and considers the DC components in addition to higher harmonic components (for example, the DC component and the first harmonic (1w) component) generated by non-linear optical mixing of modulated excitation light. Any one or more of the higher harmonic components can be used with the DC component. The method 50 can be implemented by the system 10 shown in FIG. 1.

At 52, modulated excitation light can be delivered to a sample. One or more light sources (e.g., laser light sources) can provide the excitation light at an intensity. A modulator can modulate the intensity of the excitation light according to a periodic function. Fluorophores within the sample emit a fluorescence signal upon absorption of two or more photons.

At 54, the fluorescence signal emitted from the sample can be received. The fluorescence signal can be an analog signal in the time domain. The fluorescence signal can be transformed from an analog signal to a digital signal. In some instances, the fluorescence signal can be preprocessed before the analog to digital conversion. The preprocessing can include amplifying, filtering, or the like.

At 56, the fluorescence signal can be processed in the frequency domain to measure a fluorescence lifetime. The processing can include a transformation from the time domain to the frequency domain. Additionally, the processing can also take into account the DC component and one or more higher harmonics (nw). At 58, an image based on the fluorescence lifetime can be displayed. The image can have an improve signal to noise ratio and/or resolution compared to traditionally constructed images. Notably, to increase the resolution, the excitation light must saturate the sample and higher harmonics (2w and above) may be considered.

An example method 60 that accomplishes the processing of 54 is shown in FIG. 6. At 62, the fluorescence signal is transformed to the frequency domain. For example, by a Fourier transform or other similar transform. At 64, a DC component and at least one higher harmonic component generated by non-linear optical mixing are determined. At 66, a lifetime associated with the sample is measured based on the DC component and the at least one higher harmonic component.

V. Examples

The following examples are for the purpose of illustration only and are not intended to limit the scope of the appended claims.

Theoretical Proofs

1. Signal to Noise Ratio (SNR) in Frequency Domain Fluorescence Lifetime Imaging Microscopy The following example shows a theoretical proof of super-sensitivity multiphoton frequency-domain fluorescence lifetime imaging microscopy (MPM-FD-FLIM).

System Modeling

The MPM-FD-FLIM system is modeled with time variables that are scaled to be dimensionless to simplify the analysis. When unscaled, time variables are presented with an asterisk *, including the time $t^*$, average fluorescence lifetime $\tau^*$, and modulation period $T^*=2\pi/w$. After scaling, these time variables become $t$, $\tau$, and $T$, respectively. The scaling relations are $t=wt^*$, $\tau=w\tau^*$, and $T=2\pi$.

The setup of this imaging system can be modeled as including a mode-locked laser that is used as the excitation source, an electrooptical modulator (EOM) that is used to modulate the intensity of the light and generate the modulated exciting light e(t). The EOM modulates the intensity of the light according to waveforms that are controlled by an arbitrary function generator. A sample is excited by the modulated exciting light e(t) and generates two photon excitation (2PE) fluorescence p(t), which is the convolution of $e^2(t)$ and f(t), where $$f(t) = \frac{1}{\tau}\exp\left(-\frac{t}{\tau}\right), \quad t \geq 0,$$

is the impulse response of the unsaturated fluorophore, which is normalized such that the integral on the time domain $t \geq 0$ is unity. The effective excitation light is defined as $\varepsilon(t)=e^2(t)$.

The effective excitation light is periodic; therefore, the effective excitation light can be expanded into a Fourier series as follows:

$$\varepsilon(t) = e^2(t) = \sum_{k=-\infty}^{+\infty} a_k \exp(ikt)$$

$$a_k = \frac{1}{2\pi}\int_0^{2\pi} \varepsilon(t)\exp(-ikt)dt, \quad k = 0, \pm 1, \pm 2, \ldots,$$

where $a_k$ are the corresponding Fourier coefficients. Being periodic as well, the fluorescence light and its Fourier coefficients are given by $$p(t) = \varepsilon(t) * f(t) = \sum_{k=-\infty}^{+\infty} d_k \exp(ikt)$$

$$d_k = a_k \frac{1}{1+ik\tau}, \quad k = 0, \pm 1, \pm 2, \ldots,$$

where the Convolution Theorem is used to find $d_k$.

The frequency components of the detected fluorescence p(t) are extracted by lock-in detection or Fourier analysis. These frequency components contain the information about τ. Since the collected signal is real, the analysis is simplified by limiting the frequency domain to non-negative frequencies. For the nth harmonic component, i.e., lock-in frequency nw, the corresponding complex Fourier coefficient is $$d_n = \frac{1}{2\pi} \int_0^{2\pi} p(t)\exp(-\text{int})dt, \quad n = 0, 1, 2, \ldots$$

and the real and imaginary parts, corresponding to the Fourier cosine transform (g) and Fourier sine transform (S), respectively, are $$\begin{cases} G_n = \text{Re}\{d_n\} = \frac{1}{2\pi} \int_0^{2\pi} p(t)\cos(nt)dt, \\ S_n = \text{Im}\{d_n\} = -\frac{1}{2\pi} \int_0^{2\pi} p(t)\sin(nt)dt, \end{cases} \quad n = 0, 1, 2, \ldots$$

and can be related to $a_n$ by $$\begin{cases} G_n = \text{Re}\{a_n\} = \frac{1}{1+n^2\tau^2} + \text{Im}\{a_n\}\frac{n\tau}{1+n^2+\tau^2}, \\ S_n = \text{Re}\{a_n\} = -\frac{n\tau}{1+n^2\tau^2} + \text{Im}\{a_n\}\frac{1}{1+n^2+\tau^2}, \end{cases} \quad n = 0, 1, 2, \ldots$$

which can be solved to obtain the lifetime τ. In order to calculate τ efficiently, $a_n$ should be either purely real or purely imaginary. When $a_n$ is real, $\tau = -(1/n)(S_n/G_n)$, and when $a_n$ is imaginary, $\tau = (1/n)(G_n/S_n)$. Therefore, lifetime t can be obtained not only from the fundamental component (lock in frequency ω), but also from the combination of the other nth-order harmonics generated by non-linear mixing, since all of the components, except the DC, contain the information about τ.

Figures of Merit

The photon economy (F-value) is a widely used figure of merit for comparing the SNR of FLIM systems. Systems are described in terms of the photon economy and a new figure of merit based on the saturation normalized SNR to compare the FLIM performance when it is limited by fluorescence saturation, as is common in long-lifetime (phosphorescent) systems.

Photon Economy

The photon economy (F-value) is defined as the ratio of the uncertainty in lifetime (τ) acquisition to the one in intensity (I) measurement, with the same amount of dedicated photons. $F = (\sigma_\tau/\tau)/(\sigma_I/I)$, where $\sigma_\tau$ and $\sigma_I$ are the standard deviations of the experimentally measured lifetime and intensity, respectively. If the intensity I is denoted $N_{det}$, the number of photons detected in a measurement, which is Poisson distributed, then the standard deviation $\sigma_I$ is sq rt ($N_{det}$). Therefore, the F-value is $$F = \sqrt{N_{det}} \frac{\sigma_\tau}{\tau}.$$

F now quantifies the sensitivity of the lifetime acquisition approach. F is limited to F>1 due to the shot noise; F=1 in an ideal shot-noise limited FLIM system. The F-value can also be considered as the ratio between the ideal photon quantum noise-limited SNR (sq rt ($N_{det}$)) and the measurement SNR (τ/$\sigma_\tau$). $F^2$ represents the relative number of photons required (e.g., the decrease in the measurement rate) compared to an ideal photon quantum noise-limited case for a desired SNR.

Saturation Normalized Signal to Noise Ratio

The fluorescent lifetime SNR is expressed as $$\frac{\tau}{\sigma_\tau} = \frac{\sqrt{N_{det}}}{F} = \frac{\sqrt{T_m R}}{F},$$

where R is the photon generation rate and $T_m$ is the total measurement time. However. R is fundamentally limited by fluorescence saturation, which in turn is limited by the fluorescence lifetime. Since R and F are the fundamental limits and properties of a lifetime measurement system, while $T_m$ is arbitrary, a straightforward figure of merit for comparing a saturation-limited FLIM system can be given by:

$$\overline{SNR} = \frac{\sqrt{R}}{F} = \frac{\sqrt{N_{det}}}{F\sqrt{T_m}}.$$

Excitation Signal-to-Noise Ratio Analysis

FLIM figures of merit are calculated for various excitation waveforms via analytical calculation and numerical Monte Carlo simulations. The analysis is limited to the first fundamental harmonic component 1w.

Theoretically, an error-propagation method is used, which applies if the lifetime τ can be written in the following form:

$$\tau = \frac{U}{V} = \frac{\mu_1 + \sigma_1 Y_1}{\mu_2 + \sigma_2 Y_2},$$

Where U and V are random variables, $Y_1$ and $Y_2$ are auxiliary random variables with zero mean and unity variance, $\mu_1$ and $\mu_2$ are the means, $\sigma_1$ and $\sigma_2$ are the standard deviations of U and V, respectively. In practice, $\sigma_1^2 = E[U^2]$ and $\sigma_2^2 = E[V^2]$. Denote the coefficients of variation as $\delta_1 = \sigma_1/\mu_1$ and $\delta_2 = \sigma_2/\mu_2$, and assuming that the absolute value of $\delta_2$ is less than 1, $$\tau = \frac{\mu_1}{\mu_2}(1 + \delta_1 Y_1 - \delta_2 Y_2 - \delta_1\delta_2 Y_1 Y_2 + \delta_2^2 Y_2^2 + \ldots).$$

Unless otherwise specified, moments of order larger than 2 are omitted in the following analysis, for their contribution to the final results is small. Therefore, the expected value of τ is $$E[\tau] = \frac{\mu_1}{\mu_2}(1 - \rho\delta_1\delta_2 + \delta_2^2),$$

where $\rho=E[Y_1 Y_2]$ is the correlation coefficient of U and V.

$$E[\tau^2] = \left(\frac{\mu_1}{\mu_2}\right)^2 (1 + \delta_1^2 + 3\delta_s^2 - 4\rho\delta_1\delta_2).$$

Consequently, the variance of $\tau$ is $$\sigma_\tau^2 = E[\tau^2] - E[\tau]^2 = \left(\frac{\mu_1}{\mu_2}\right)^2 (\delta_1^2 + \delta_2^2 - 2\rho\delta_1\delta_2).$$

Additionally, Monte Carlo simulations are used to verify the analytical results. The Monte Carlo simulations are done by dividing each modulation period (T=2π)/into M time units Δt=2π/M. The number M is sufficiently large (here, M=300000) to keep the probability of several photons emitting in a time unit small, thus ignoring the piling-up effect. In each unit, a uniformly distributed random number between 0 and 1 is generated and compared with the probability density emitting in a time unit small, thus ignoring the piling-up effect. In each unit, a uniformly distributed random number between 0 and 1 is generated and compared with the probability density described by the product of the fluorescent light intensity p(t) and the time unit Δt. If the generated random number is smaller than p(t)Δt, it will be regarded as a fluorescent photon being emitted. Then, the detector will cumulatively record the detected photons and extract the lifetime information in each measurement (i.e., $N_{mod}$ periods, here $N_{mod}$=2400) based on the lock-in technique in use. The measurement process is repeated 1000 times to generate a set of output values, including the acquired lifetime t and the total number of detected photons $N_{det}$. Following this, a statistical analysis is performed to find the means and variances of these outputs, and the figures of merit are obtained accordingly.

Square Root of Sinusoid Modulation Waveform

The modulation waveform can be a square root of sinusoidal function. After the 2PE fluorescence process, the effective excitation light has a waveform of a sinusoidal function. In this way, the two-photon fluorescent emission that the fluorophore in the sample experiences is equivalent to a one-photon process with a sinusoidally modulated excitation light. The resulting performances of these two processes are expected to be the same and thus can be used to compare to linear excitation. The illumination of light is $$e(t) = \frac{1}{\sqrt{2\pi}}[1 + m\sin(t)]^{\frac{1}{2}},$$

where m is the degree of modulation, 0<m≤1. With the 2PE process, the effective exciting light is $$\varepsilon(t) = \frac{1}{2\pi}[1 + m\sin(t)],$$

which has the first harmonic Fourier coefficient $$a_1 = -\frac{m}{4\pi}i.$$

Correspondingly, the fluorescence p(t) has the first harmonics $$G_1 = -\frac{m}{4\pi}\frac{\tau}{1+\tau^2}, S_1 = -\frac{m}{4\pi}\frac{\tau}{1+\tau^2}.$$

Therefore, the lifetime can be acquired from $\tau=G_1/S_1$. Note that the equations for e(t) and ε(t) have been normalized so that the integral of the fluorescence in a modulation period is unified.

$$\int_0^{2\pi} p(t)dt = 1.$$

Thus, on average, only one photon is emitted in every period; i.e., the 2PE emission rate is assumed to be constant. This assumption is feasible because the problem under investigation is a scaled one; it can be recovered to realistic situations once the modulation frequency w is included.

p(t) can be regarded as the probability density function of detecting a photon. For a random variable X in the detector, if its realization is based on detecting a photon, then its expected value in a modulation period, or for each emitting photon, is $$E[X] = \int_0^{2\pi} X p(t)dt.$$

In each measurement, $N_{det}$ photons are detected. Therefore, the expected value for X in one measurement is $N_{det}E[x]$. Denote the random process corresponding to $G_1$ and $S_1$ in the lock-in detector as $X_{G1}$ and $X_{S1}$, respectively. Then, for the square root of sinusoidal modulation, the expected value of the acquired lifetime τ is $$\bar{\tau} = \frac{N_{det}E[X_{G1}]}{N_{det}E[X_{S1}]}.$$

It is known that $$X_{G1} = \cos(t), X_{S1} = -\sin(t).$$

So the expected values are $$E[X_{G1}] = \int_0^{2\pi} p(t)\cos(t)dt = 2\pi G_1,$$

$$E[X_{S1}] = -\int_0^{2\pi} p(t)\sin(t)dt = 2\pi S_1.$$

$U=G_1$ and $V=S_1$, and $$\mu_1 = E[U] = N_{det}E[X_{G1}] = -N_{det}\frac{m}{2}\frac{\tau}{1+\tau^2},$$

$$\mu_2 = E[V] = N_{det}E[X_{S1}] = -N_{det}\frac{m}{2}\frac{\tau}{1+\tau^2}.$$

The variances and the correlation coefficient are $$\sigma_1^2 = E[U^2] = N_{det}E[X_{G1}^2],$$

$$\sigma_2^2 = E[V^2] = N_{det}E[X_{S1}^2],$$

$$\rho\sigma_1\sigma_2 = E[UV] = N_{det}E[X_{G1}X_{S1}],$$

where $$E[X_{G1}^2]=E[\cos^2(t)]=\tfrac{1}{2}(1+2\pi G_2),$$

$$E[X_{S1}^2]=E[\sin^2(t)]=\tfrac{1}{2}(1-2\pi G_2),$$

$$E[X_{G1}X_{S1}]=E[-\cos(t)\sin(t)]=\tfrac{1}{2}2\pi S_2.$$

Since $a_2$ of the effective exciting light is 0, $G_2=0$, $S_2=0$. Therefore, $$\sigma_1^2=\tfrac{1}{2}N_{det},\ \sigma_2^2=\tfrac{1}{2}N_{det},\ \rho\sigma_1\sigma_2=0.$$

The standard deviation of the lifetime is $$\sigma_\tau = \sqrt{\frac{2}{N_{det}}}\frac{(1+\tau^2)^{\frac{3}{2}}}{m}.$$

Consequently, the F-value is $$F = \sqrt{N_{det}}\frac{\sigma_\tau}{\tau} = \sqrt{2}\frac{(1+\tau^2)^{\frac{3}{2}}}{m\tau}.$$

The normalized SNR is $$\overline{SNR} = \frac{\sqrt{N_{det}}}{F}\frac{1}{\sqrt{2\pi N_{mod}}} = \sqrt{\frac{N_{det}}{N_{mod}}}\frac{1}{F\sqrt{2\pi}},$$

Where $N_{mod}$ is the number of modulation periods in a measurement. Since in this analysis, each period, on average, emits one photon, $N_{det}=N_{mod}$.

$$\overline{SNR} = \frac{1}{F\sqrt{2\pi}}.$$

Figure 7:
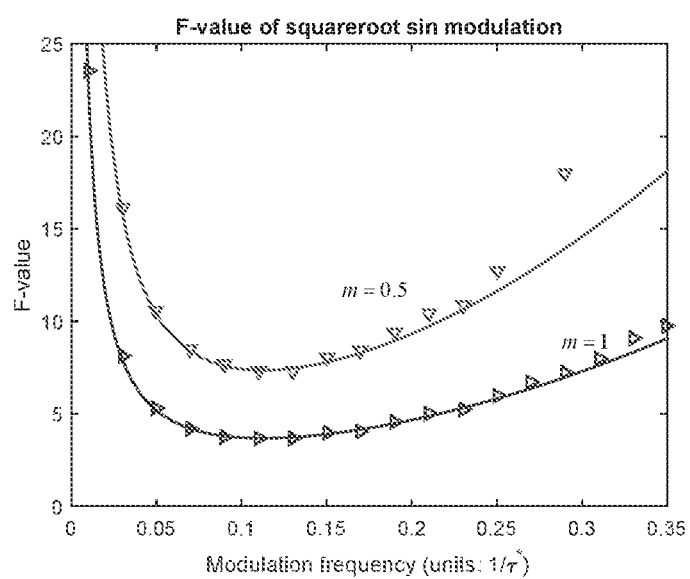
FIG. 7 shows a plot of the F-value as a function of modulation frequency with the first harmonic frequency (1w) lock-in detection for square-root sinusoidally modulated excitation light.

The theoretical results of the calculation of the F-value, with the variance of the degree of modulation m, are shown in FIG. 7, where the corresponding Monte Carlo simulation results are also plotted as dots. FIG. 7 shows the agreement between the theoretical derivations and the Monte Carlo simulations. All these F-vales are plotted as a function of the modulation frequency, which has a unit of $1/\tau^*$, essentially Hz. As can be read from the figure, the best F-value is F=3.67, corresponding to $\overline{SNR}=0.11$ for m=1 at the frequency of $0.11/\tau^*$. This result is in accordance with expectation and is the same as a sinusoidally modulated one-photon process. Also, as the degree of modulation m goes down, the figures of merit get worse. This calls for a high degree of modulation for the exciting light in real experiments.

Sinusoid

A sinusoidally modulated exciting light is common in use and easy to produce. With the same normalization criterion for p(t), the illumination and corresponding effective excitation light signals are:

$$e(t) = \frac{1}{\sqrt{\pi(m^2+2)}}[1+m\sin(t)],$$

-continued $$\varepsilon(t) = \frac{1}{2\pi(m^2+2)}[m^2 + 2 + 4m\sin(t) - m^2\cos(2t)],$$

where m is the degree of modulation $0<m\leq 1$. The first harmonic Fourier coefficient $\varepsilon(t)$ is $$a_1 = -\frac{m}{\pi(m^2+2)}i.$$

Then $$G_1 = -\frac{m}{\pi(m^2+2)}\frac{\tau}{1+\tau^2},$$

$$S_1 = -\frac{m}{\pi(m^2+2)}\frac{1}{1+\tau^2}.$$

Consequently, the lifetime is also obtained by $\tau=G_1/S_1$, which shares the same form as above. Additionally, $U=G_1$ and $V=S_1$ and $$\mu_1 = E[U] = N_{det}E[X_{G1}] = -N_{det}\frac{2m}{m^2+2}\frac{\tau}{1+\tau^2}$$

$$\mu_2 = E[V] = N_{det}E[X_{S1}] = -N_{det}\frac{2m}{m^2+2}\frac{1}{1+\tau^2}.$$

The second harmonic Fourier coefficients are $$a_2 = \frac{m^2}{4\pi(m^2+2)},$$

$$G_2 = -\frac{m^2}{4\pi(m^2+2)}\frac{1}{1+4\tau^2},$$

$$S_2 = \frac{m^2}{4\pi(m^2+2)}\frac{2\tau}{1+4\tau^2}.$$

Therefore, the second moments are $$\sigma_1^2 = E[U^2] = N_{det}E[X_{G1}^2] = N_{det}\left[\frac{1}{2} - \frac{m^2}{4(m^2+2)}\frac{1}{1+4\tau^2}\right],$$

$$\sigma_2^2 = E[V^2] = N_{det}E[X_{S1}^2] = N_{det}\left[\frac{1}{2} - \frac{m^2}{4(m^2+2)}\frac{1}{1+4\tau^2}\right],$$

$$\rho\sigma_1\sigma_2 = E[UV] = N_{det}E[X_{G1}X_{S1}] = N_{det}\frac{m^2}{4(m^2+2)}\frac{2\tau}{1+4\tau^2}.$$

Then, the standard deviation of t is obtained, $$\sigma_\tau = \frac{1+\tau^2}{4m}\left(\frac{1}{N_{det}}\frac{m^2+2}{1+4\tau^2}\right)^{\frac{1}{2}} \times (4+m^2+7m^2\tau^2+20\tau^2+8m^2\tau^4+16\tau^4)^{\frac{1}{2}}.$$

Figure 8:
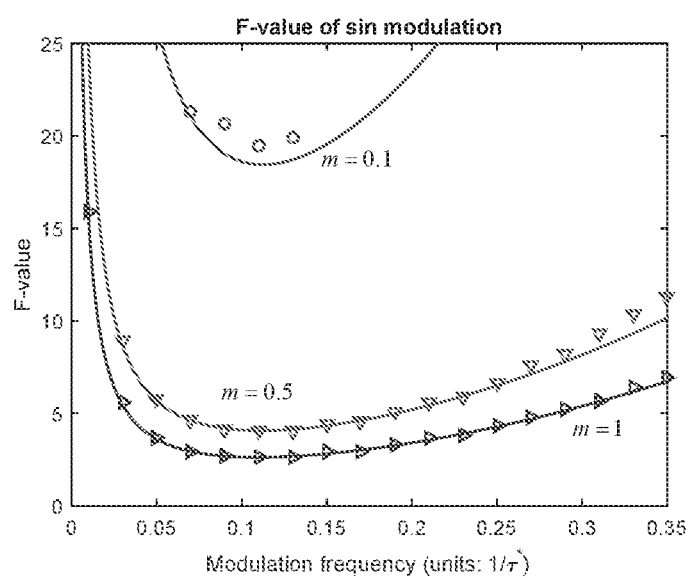
FIG. 8 shows a plot of the F-value as a function of modulation frequency with the first harmonic frequency (1w) lock-in detection for sinusoidally modulated excitation light.

So the F-value is $$F = \frac{1+\tau^2}{4m\tau}\left(\frac{m^2+2}{1+4\tau^2}\right)^{\frac{1}{2}} \times (4+m^2+7m^2\tau^2+20\tau^2+8m^2\tau^4+16\tau^4)^{\frac{1}{2}},$$

and the normalized SNR has the same form as above. The derive Monte Carlo stimulated values are plotted in FIG. 8.

The best figures of merit are F=2.62, $\overline{SNR}$=0.15 for m=1 at the frequency of 0.11/τ*. The figures of merit worsen as the degree of modulation decreases. Therefore, a high degree of modulation is also required in this case.

Periodic Square Wave and Dirac Comb

Excitation by a periodic square wave, or ideally a Dirac comb when the duty cycle is zero, though it requires a large system bandwidth, is preferable in FLIM. The same normalization for p(t) results in the excitation and the effective excitation light signals as $$e(t) = \sum_{k=-\infty}^{\infty} \frac{1}{\sqrt{2\pi a}} [\theta(t - 2\pi k + \pi a) - \theta(t - 2\pi k - \pi a)],$$

$$\varepsilon(t) = \sum_{k=-\infty}^{\infty} \frac{1}{2\pi a} [\theta(t - 2\pi k + \pi a) - \theta(t - 2\pi k - \pi a)],$$

where a is the duty cycle 0≤a≤1, and θ(·) is the unit step function. The first harmonic Fourier coefficient of ε(t) is $$a_1 = \frac{1}{2\pi} \frac{\sin(\pi a)}{\pi a}, \text{ and}$$

$$G_1 = \frac{1}{2\pi} \frac{\sin(\pi a)}{\pi a} \frac{1}{1+\tau^2},$$

$$S_1 = -\frac{1}{2\pi} \frac{\sin(\pi a)}{\pi a} \frac{\tau}{1+\tau^2}.$$

So the lifetime can be extracted by $\tau = -S_1/G_1$. U=$-S_1$ and V=$G_1$, so $$\mu_1 = E[U] = -N_{det}E[X_{S1}] = N_{det} \frac{\sin(\pi a)}{\pi a} \frac{\tau}{1+\tau^2},$$

$$\mu_2 = E[V] = N_{det}E[X_{G1}] = N_{det} \frac{\sin(\pi a)}{\pi a} \frac{1}{1+\tau^2}.$$

The second harmonic Fourier coefficients are $$a_2 = \frac{1}{2\pi} \frac{\sin(2\pi a)}{2\pi a},$$

$$G_2 = \frac{1}{2\pi} \frac{\sin(2\pi a)}{2\pi a} \frac{1}{1+4\tau^2},$$

$$S_2 = -\frac{1}{2\pi} \frac{\sin(2\pi a)}{2\pi a} \frac{2\tau}{1+4\tau^2},$$

giving the second moments as $$\sigma_1^2 = E[U^2] = N_{det}E[X_{S1}^2] = N_{det}\left[\frac{1}{2} - \frac{\sin(2\pi a)}{4\pi a} \frac{1}{1+4\tau^2}\right],$$

$$\sigma_2^2 = E[V^2] = N_{det}E[X_{G1}^2] = N_{det}\left[\frac{1}{2} + \frac{\sin(2\pi a)}{4\pi a} \frac{1}{1+4\tau^2}\right],$$

$$\rho\sigma_1\sigma_2 = E[UV] = N_{det}\{-E[X_{G1}X_{S1}]\} = N_{det}\frac{\sin(2\pi a)}{4\pi a} \frac{2\tau}{1+4\tau^2}.$$

Then $$\sigma_\tau = \frac{1+\tau^2}{2\sin(\pi a)}\left(\frac{1}{N_{det}} \frac{\pi a}{1+4\tau^2}\right)^{\frac{1}{2}} \times$$

$$(2\pi a - \sin(2\pi a) + 10\pi a\tau^2 - 3\sin(2\pi a)\tau^2 + 8\pi a\tau^4)^{\frac{1}{2}}.$$

Consequentially, the F-value is calculated as $$F = \frac{1+\tau^2}{2\tau\sin(\pi a)}\left(\frac{\pi a}{1+4\tau^2}\right)^{\frac{1}{2}} \times$$

$$(2\pi a - \sin(2\pi a) + 10\pi a\tau^2 - 3\sin(2\pi a)\tau^2 + 8\pi a\tau^4)^{\frac{1}{2}}.$$

By letting a→0, the F-value of a Dirac comb modulation can be directly obtained as $$F = (1+\tau^2)\left(\frac{1+2\tau^2}{1+4\tau^2}\right)^{\frac{1}{2}}.$$

Figure 9:
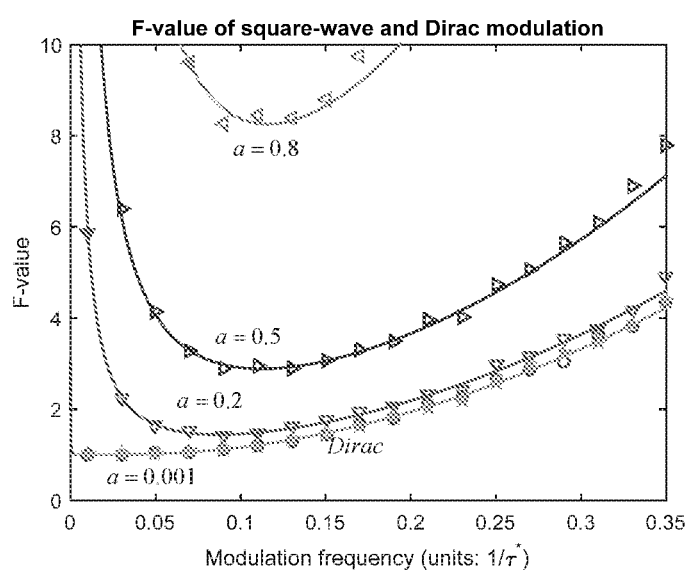
FIG. 9 shows a plot of the F-value as a function of modulation frequency with the first harmonic frequency (1w) lock-in detection for periodic square-wave and Dirac comb modulated excitation light.

For both cases, the normalized SNR can be calculated as above. FIG. 9 plots the F-values from these theoretical derivations and from the Monte Carlo simulations. The best figures of merit are F=1.00, $\overline{SNR}$=0.40 for both the Dirac comb and the periodic square wave with a duty cycle a=0.001. These two modulation waveforms have very similar F-value curves, as the duty cycle of the square wave is so small that it can be approximately regarded as a Dirac function. The optimal SNR performance can be achieved as long as the frequency is smaller than 0.04/τ*, which is a band instead of a single frequency point. It can be seen in FIG. 9 that square waves with smaller duty cycles produce better F-values in this case.

Comparison

Figure 10:
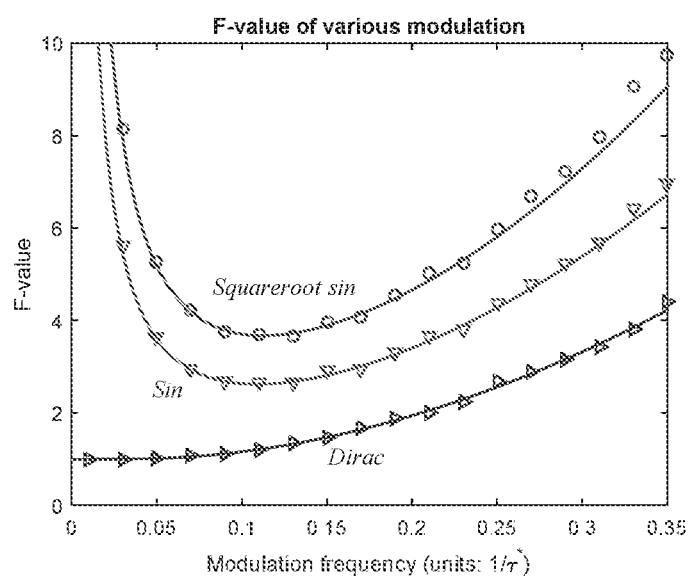
FIG. 10 shows a plot of the F-value as a function of modulation frequency with the first harmonic frequency (1w) lock-in detection for excitation lights with various modulation.

FIG. 10 compares the F-values of the aforementioned modulation waveforms. The Dirac comb (or periodic square wave with a very small duty cycle) has the best performance in SNR, while the square root of sinusoidal modulation is the worst. This phenomenon can be explained by Table 1, where the first harmonic Fourier coefficients $a_1$ for the effective existing lights ε(t) are listed and compared. The larger $|a_1|$, the better figures of merit the modulation has. This correlation between $|a_1|$ and the figures of merit is expected because the detector only locks in the first harmonic frequency components $G_1$ and $S_1$, which are directly related to $a_1$, to calculate lifetime. While the noise, or uncertainty, in each modulation form is the same, the signal strength is stronger for the one with larger $|a_1|$; therefore, the SNR performance is positively correlated to the magnitude of $a_1$. This analysis can be generalized for the lock-in of the nth harmonic component. Also, from the comparison, the F-value for sinusoidal modulation with m=1 is 2.62, which is led by the 2PE process or the fluorophores. This means that the number of photons needed to acquire a certain SNR is about 6.9 (approximately $2.62^2$) times more than of an ideal case. On the other hand, F=3.67 of the corresponding one-photon excitation, which is equivalent to the two-photon square root of sinusoidal modulation here, requires about 13.5 (approximately $3.67^2$) times more photons to be collected than an ideal case. The 50% decrease in the required photon number shows a potential advantage in the SNR of two-photon microscopy compared to the conventional one-photon microscopy.

TABLE 1

Comparison of Modulation Waveforms

| Waveform | min F | max $\overline{SNR}$ | $a_1$ | $|a_1|$ |
|---|---|---|---|---|
| Square root Sin | 3.67 | 0.11 | $-\frac{1}{4\pi}i$ | 0.0796 |

TABLE 1-continued

Comparison of Modulation Waveforms

| Waveform | min F | max $\overline{SNR}$ | $a_1$ | $\|a_1\|$ |
|---|---|---|---|---|
| Sin | 2.62 | 0.15 | $-\frac{1}{3\pi}i$ | 0.1061 |
| Dirac | 1.00 | 0.40 | $\frac{1}{2\pi}$ | 0.1592 |

Detection Signal to Noise Ratio Analysis

The SNR performance of FD-FLIM is also limited by the detector lock-in implementation. In this section, the discussion is limited to sinusoidally modulated excitation light, for it is easy to produce and is commonly used to evaluate FD-FLIM.

The lock-in techniques can only exploit the DC and the first and second harmonic Fourier coefficients of $\varepsilon(t)$, $$a_0 = \frac{1}{2\pi}, \quad a_1 = -\frac{m}{\pi(m^2+2)}i, \quad a_2 = -\frac{m^2}{4\pi(m^2+2)}.$$

This leads to $$G_0 = \frac{1}{2\pi}, \quad S_0 = 0,$$

$$G_1 = -\frac{m}{\pi(m^2+2)}\frac{\tau}{1+\tau^2}, \quad S_1 = -\frac{m}{\pi(m^2+2)}\frac{1}{1+\tau^2},$$

$$G_2 = -\frac{m^2}{4\pi(m^2+2)}\frac{1}{1+4\tau^2}, \quad S_2 = \frac{m^2}{4\pi(m^2+2)}\frac{2\tau}{1+4\tau^2}.$$

The lifetime $\tau$ can then be obtained by solving the equations above. Since these Fourier coefficients provide redundant knowledge of $\tau$, a variety of combinations among them can be exploited to get $\tau$.

1w Lock-in

The lifetime can be extracted by solely measuring $G_1$ and $S_1$, which means that only the first harmonic frequency 1w is locked in. The lifetime is established with $\tau=G_1/S_1$, and the figures of merit are calculated as above with regard to sinusoidal modulation.

2w Lock-in

The second harmonic (2w) components $G_2$ and $S_2$ can also be used to determine the lifetime:

$$\tau = -\frac{1}{2}\frac{S_2}{G_2},$$

and $X_{G2}$ and $X_{S2}$ correspond to the random processes in the detector corresponding to $G_2$ and $S_2$ so that the expected value of the acquired lifetime is $$\bar{\tau} = -\frac{1}{2}\frac{N_{det}E[X_{S2}]}{N_{det}E[X_{G2}]}.$$

With the definition of Fourier transforms, we have $$X_{G2}=\cos(2t), X_{S2}=-\sin(2t),$$

and the expected values are $$E[X_{G2}]=\int_0^{2\pi}p(t)\cos(2t)dt=2\pi G_2,$$

$$E[X_{S2}]=-\int_0^{2\pi}p(t)\sin(2t)dt=2\pi S_2$$

With $U=-S_2/2$ and $V=G_2$ $$\mu_1 = E[U] = -\frac{1}{2}N_{det}E[X_{S2}] = N_{det}\frac{m^2}{2(m^2+2)}\frac{\tau}{1+4\tau^2},$$

$$\mu_2 = E[V] = N_{det}E[X_{G2}] = -N_{det}\frac{m^2}{2(m^2+2)}\frac{1}{1+4\tau^2}.$$

Accordingly, $$E[X_{S2}^2]=E[\sin^2(2t)]=\frac{1}{2}(1-2\pi G_4),$$

$$E[X_{G2}^2]=E[\cos^2(2t)]=\frac{1}{2}(1+2\pi G_4),$$

$$E[X_{G2}X_{S2}]=E[-\cos^2(2t)\sin(2t)]=\frac{1}{2}2\pi S_4.$$

It is known that $a_4=0$, and therefore $G_4=0$ and $S_4=0$. Therefore $$\sigma_1^2=\frac{1}{8}N_{det}, \sigma_2^2=\frac{1}{2}N_{det}, \rho\sigma_1\sigma_2=0.$$

The standard deviation $\tau$ can be calculated $$\sigma_\tau = \sqrt{\frac{1}{2N_{det}}\frac{m^2+2}{m^2}(1+4\tau^2)^{\frac{3}{2}}}.$$

Consequently, the F-value is $$F = \frac{m^2+2}{\sqrt{2}\,m^2}\frac{(1+4\tau^2)^{\frac{3}{2}}}{\tau},$$

and the normalized SNR can be obtained,

DC and 1w Lock-in

The lifetime can also be computed by the combination of DC ($G_g$) and 1w ($S_1$) components.

$$\tau = \left(-\frac{2m}{m^2+2}\frac{G_0}{S_1}-1\right)^{\frac{1}{2}}.$$

The uncertainty in $\tau$ can be obtained indirectly with the analysis method for a function of a random variable. Generally, for two random variables X and Y with a functional relationship $Y=g(X)$, two assumptions can be made: (1) the function $g(X)$ is "relatively smooth" in the region around the mean value $\mu_x$ of X and (2) X has a small standard deviation $\sigma_x$ ($\sigma_x<1$), then $Y=g(X)$ can be Taylor expanded around the mean value $\mu_x$ and yields $$Y = g(X)|_{X=\mu_X} + (X-\mu_X)\frac{dg}{dx}\bigg|_{X=\mu_X} + \frac{1}{2!}(X-\mu_X)^2\frac{d^2g}{dx^2}\bigg|_{X=\mu_X} + \dots.$$

Taking the expected value of both sides of this equation $$E[Y] = g(\mu_X) + \frac{\sigma_X^2}{2}g''(\mu_X),$$

where the relation $E[X-\mu_x]=E[X]-\mu_x=0$ has been used,

Specifically in this case $$X = \frac{G_0}{S_1}, \quad Y = \tau = g(X) = \left(-\frac{2m}{m^2+2}X - 1\right)^{\frac{1}{2}}.$$

The mean and standard deviation of X are calculated first. Denoting $X_{G0}$ as the random process corresponding to G0 in the detector, and $X_{G0}=\cos(0t)=1$, the expected value $$E[X_{G0}] = \int_0^{2\pi} p(t)dt = 1.$$

Additionally $$\mu_1 = E[U] = N_{det}E[X_{G0}] = N_{det},$$

$$\mu_2 = E[V] = N_{det}E[X_{S1}] = -N_{det}\frac{2m}{m^2+2}\frac{1}{1+\tau^2}.$$

Then the variances and correlation coefficients are $$\sigma_1^2 = E[U^2] = N_{det}E[X_{G0}^2] = N_{det},$$

$$\sigma_2^2 = E[V^2] = N_{det}E[X_{S1}^2] = N_{det}\left[\frac{1}{2} + \frac{m^2}{4(m^2+2)}\frac{1}{1+4\tau^2}\right],$$

$$\rho\sigma_1\sigma_2 = E[UV] = N_{det}E[X_{S1}] = -N_{det}\frac{2m}{m^2+2}\frac{1}{1+\tau^2}.$$

Therefore, the moments of X can be calculated as $$\mu_X = -\frac{m^2+2}{2m}(1+\tau^2)$$

$$\left\{1 - \frac{1}{N_{det}} + \frac{1}{N_{det}}\left(\frac{m^2+2}{2m}\right)^2 \times (1+\tau^2)^2\left[\frac{1}{2} + \frac{m^2}{4(m^2+2)}\frac{1}{1+4\tau^2}\right]\right\},$$

$$\sigma_X^2 = \frac{1}{N_{det}}\left(\frac{m^2+2}{2m}\right)^2(1+\tau^2)^2$$

$$\left\{-1 + \left(\frac{m^2+2}{2m}\right)^2 \times (1+\tau^2)^2\left[\frac{1}{2} + \frac{m^2}{4(m^2+2)}\frac{1}{1+4\tau^2}\right]\right\}.$$

The second derivative of g(X) yields $$g''(X) = -\frac{m^2}{(m^2+2)^2}\left(-\frac{2m}{m^2+2}X - 1\right)^{-\frac{3}{2}}.$$

Consequently, the mean value of Y (or τ) is $$E(\tau) = \left(-\frac{2m}{m^2+2}\mu_X - 1\right)^{\frac{1}{2}} - \frac{m^2\sigma_X^2}{2(m^2+2)^2}\left(\frac{-2m}{m^2+2}\mu_X - 1\right)^{-\frac{3}{2}}.$$

The mean square value of τ is $$E(\tau^2) = E\left[-\frac{2m}{m^2+2}X - 1\right] = -\frac{2m}{m^2+2}\mu_X - 1,$$

so the standard deviation of the acquired lifetime can be calculated from $$\sigma_\tau = (E[\tau^2] - E[\tau]^2)^{\frac{1}{2}},$$

and the figures of merit can be obtained accordingly.

Comparison

Figure 11:
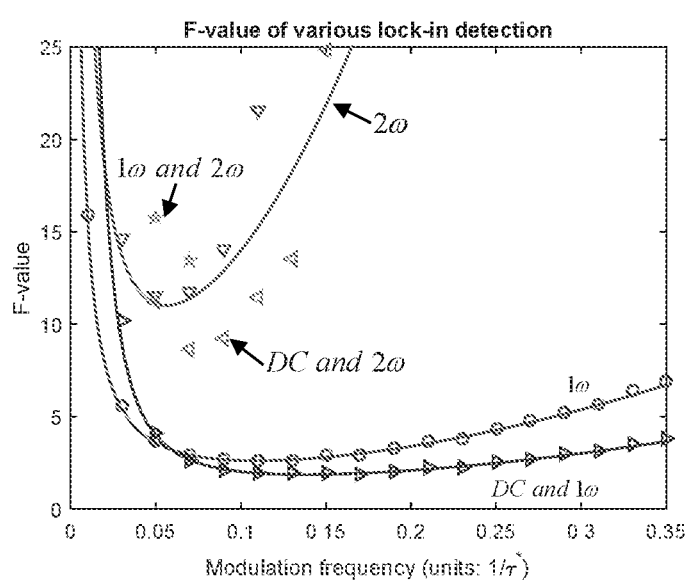
FIG. 11 shows a plot of the F-value as a function of modulation frequency with various lock-in detection techniques for sinusoidally modulated excitation light.

FIG. 11 plots the F-values from the theoretical results described for 1w Lock-in, 2w Lock-in, and DC and 1w Lock-in along with the Monte Carlo stimulations. The best figures of merit for 1w lock-in detection are F=2.62, $\overline{SNR}$=0.15 at the frequency of 0.11/τ*. This indicates that the optimal 1w detection requires 6.9 (approximately $2.62^2$) More photons to achieve the same SNR as the ideal case. For 2w lock-in, the SNR performance is much worse, resulting in F=11.02, $\overline{SNR}$=0.04 at the frequency of 0.06/τ*. However, the combination of DC and 1w lock-in detection shows an improved figure of merit of F=1.87, $\overline{SNR}$=0.21 at the frequency of 0.14/τ*. This means that the DC and 1w combination only needs to collect 3.5 (approximately $1.87^2$) times more photons to achieve the same SNR level as the ideal case, which corresponds to a 2× improvement in the acquisition rate relative to the traditional 1w-only detection method. The combined DC and 1w lock-in approach is superior to the single frequency lock in method for modulation frequencies greater than 0.06/τ*. This allows for a wide range of high-performance modulation frequencies, which is important for experimental design and implementations.

Additionally, since the noise in this system is predominantly determined by photon quantum noise, the noise spectrum can be assumed to be white and independent of modulation frequency up to a limit set by the bandwidths of the detectors and amplifiers. To achieve a high SNR, the frequency components with the largest magnitude should be employed (regardless of frequency). Although the DC component has the largest magnitude, it does not contain lifetime information. Therefore, the combination of DC and 1w lock-in will result in the best SNR. The lock-in techniques exploiting the weak 2w signal, on the other hand, will have poor SNR performance.

2. Saturated Excitation (SAX) Multiphoton Microscopy for Super-Resolution Imaging The following example illustrates a theoretical proof of saturated excitation (SAX) multiphoton microscopy (MPM) for super-resolution imaging, extending the super-sensitivity MPM-FD-FLIM.

Two-Level System Model

The rate equation governing the excitation dynamics of a two level system in which absorption, stimulated emission, and spontaneous emission are the primary drivers of observed fluorescence can be written as a function of axial position (z), lateral position (r) and time (t) as:

$$\frac{d\Delta N(\rho, z, t)}{dt} + (2W(\rho, z, t) + \gamma)\Delta N(\rho, z, t) = \gamma,$$

where $\Delta N(\rho, z, t)$ is the population difference between ground and excited state, $W(\rho, z, t)$ is the rate of absorption and stimulated emission and γ is the rate of spontaneous emission related to fluorescence lifetime by t=1/γ. A solution to a differential equation of this form can be written:

$$\Delta N(\rho, z, t) = \frac{\int \exp\left(\int 2W(\rho, z, t) + \gamma dt\right) dt}{\gamma \exp(\int 2W(\rho, z, t) + \gamma dt)},$$

where W(ρ, z, t), is proportional to the two-photon absorption cross section, s, and the spatial and temporal profiles of the excitation, S(x, y, z)=S(ρ, z) and A(t) respectively. In the case where W(ρ, z, t) is many orders of magnitude faster than γ the equation can be simplified to:

$$\Delta N(\rho,z,t) = \gamma \exp[-2\sigma S(\rho,z)^2 \times \int A(t)^2 dt] \exp[-\gamma t] \int \exp[\gamma t] dt,$$

and further to:

$$\Delta N(\rho,z,t) = \exp[-2\sigma S(\rho,z)^2 \int A(t)^2 dt].$$

Depending on the specific temporal shape of the excitation pulse A(t), an analytical or numerical integration can be performed to arrive at the final form of ΔN(ρ, z, t) after a single pulse. It should be noted that constants of integration have been set to unity expressing the assumption that all molecules excited by a given pulse relax back to the ground state prior to the subsequent laser pulse. The fluorescence will ultimately be proportional to the population of the excited state and from a total population set to unity, so that the excited state probability can be found as:

$$N_1(\rho,z,t) = \tfrac{1}{2}(1 - \Delta N(\rho,z,t)).$$

If the excitation is modulated by a periodic function, $F_m(t)$, with a frequency, $W_m$, much slower than the pulse repetition rate, and can therefore be treated as a constant over the pulse integration, the overall excited state probability can be denoted as:

$$N_1(\rho,z,t) = \tfrac{1}{2}(1 - \exp[-2\sigma S(\rho)^2 \int A(t)^2 dt F_m(t)^2]).$$

In this work, we will consider the impact on imaging resolution for sinusoidal modulation function of the form:

$$F_m(t) = \tfrac{1}{2}(\cos(\omega_m t) + 1),$$

spatial beam profiles of the form:

$$S(\rho, z) = \frac{2}{\pi w(z)^2} e^{-2\frac{\rho^2}{w(z)^2}},$$

and temporal pulse profiles of the form:

$$A(t) = \frac{2\langle P \rangle}{h\nu} \sqrt{\frac{\ln 2}{\pi}} \frac{1}{f_p \alpha} e^{-\ln 2\left(\frac{2(t-t_g)}{\alpha}\right)^2},$$

where $$w(z)^2 = \left(\frac{\lambda}{\pi NA}\right)^2 \left(1 + \left(\frac{z}{z_R}\right)^2\right),$$

NA is the objective numerical aperture, $$w(z)^2 = \left(\frac{\lambda}{\pi NA}\right)^2 \left(1 + \left(\frac{z}{z_R}\right)^2\right)$$

is the wavelength of excitation light, $z_R = \lambda/\pi NA^2$, <P> is the average optical power, $f_p$ is the pulse repetition rate, and α is the pulse width. An expression for the excited state probability can be simplified to:

$$N_1 = \frac{1}{2}\left(1 - e^{-\left(\frac{1}{2}\cos(\omega t) + \frac{1}{2}\right)^2 2\sigma S(\rho)^2 \beta}\right),$$

where $$\beta(t) = \frac{8\ln 2}{\sqrt{\pi}\,\alpha}\left(\frac{\langle P \rangle}{h\nu f_p}\right)^2.$$

Even in the unsaturated case, fluorescence signal will have the frequency characteristics of (½ cos(wt)+½)²=½ cos(wt)+⅛ cos(2 wt)=⅜ and thus both the first and second harmonic should exist. In the saturated case, the crests of the squared sinusoid flatten out and higher order harmonic terms are present in the spectrum. These higher order terms can be found numerically for specific experimental conditions.

Simulation Results

Figure 12:
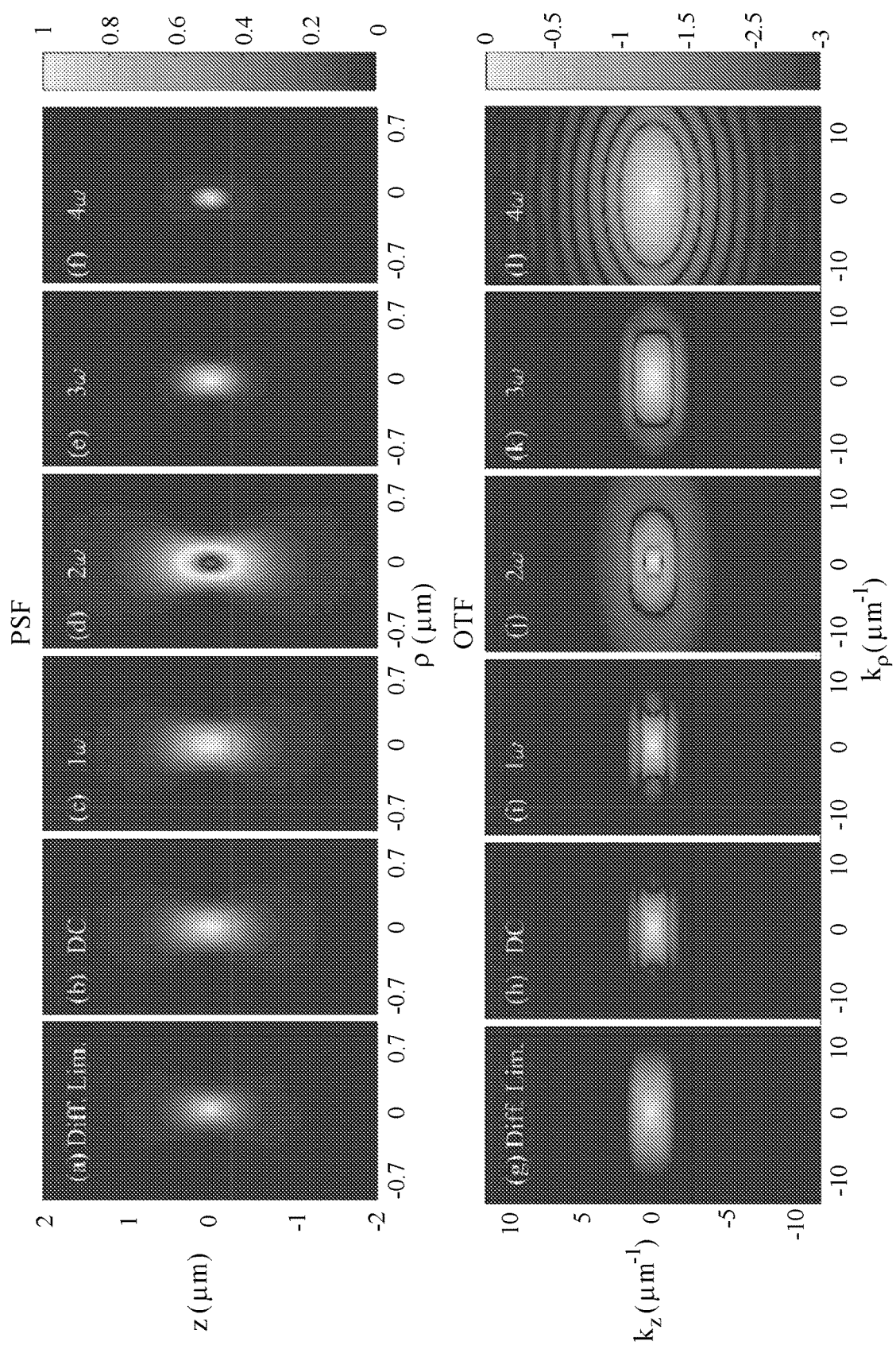
FIG. 12 shows examples of saturated excitation point-spread functions using excitation powers of 2× the onset of saturation.

The equation for $N_1(\rho, z, t)$ was solved numerically with a sinusoidally varying excitation amplitude in $F_m(t)$ and with simulation parameters: σ=150 GM, NA=0.8, and λ=800 nm. PSFs corresponding to the magnitudes of each harmonic component were reconstructed from the Fourier transform of $N_1(\rho, z, t)$. Simulation work was performed in Matlab (Mathworks, Natick, Mass.). Example PSFs and optical transfer functions (i.e., the spatial frequency components of the PSF, or OTFs) are presented in FIG. 12 for several MPM SAX harmonic frequencies when saturation depth is 2. The physical origin of these PSFs, and their application to super-resolution imaging is presented below.

Figure 13:
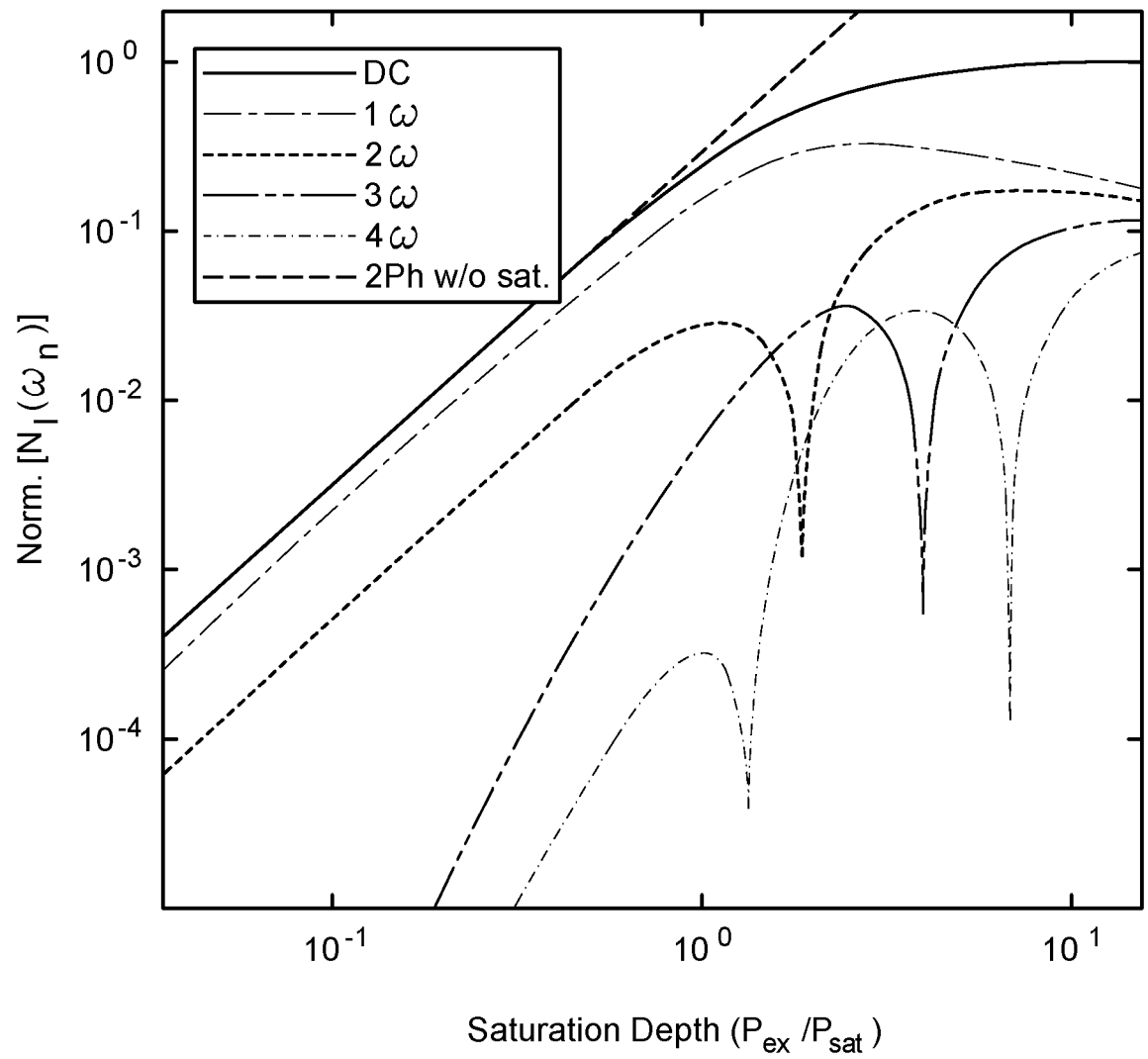
FIG. 13 shows a plot of harmonic magnitude at a single point in the excitation PSF with increasing saturation depth.

The calculated response for a single fluorophore located at the center of the diffraction PSF are shown in FIG. 13. Saturation depth is defined as the average excitation power <P>, divided by the power at which emission reaches ½ the saturated value, <$P_{sat}$>. The magnitude of the DC component before saturation increases with power squared, as expected in 2-photon emission. Saturation is clearly seen when the DC component (blue solid line) departs from the ideal, 2-photon behavior (black dashed line), as predicted from the steady state solution. Local saturation is seen to occur at relatively shallow saturation depths.

The magnitudes of the higher harmonics attributed to saturation (≥3107) increase faster than power squared and exhibit discontinuities in slope at specific saturation depths. These features create nodes in the PSF correspond to specific harmonic components switching from in- to out-of-phase with the excitation modulation. The existence of such nodes contributes two interesting results which, combined, produce PSF with higher spatial resolution than allowed by diffraction: (1) the increase in harmonic magnitude grows faster than $P^2$ near nodes and (2) nodes create zeros in the PSF. For example, the local excitation at the center of a PSF could be such that little to no second harmonic component is found. This would result in a ring-like PSF in the second harmonic, which is seen in FIG. 12(d).

The super-resolution capability of saturated excitation MPM is established by analyzing the resulting PSFs in the spatial frequency domain. Imaging is the convolution of a point spread function with an object ($i(\vec{r}) = h(\vec{r}) \otimes o(\vec{r})$), which corresponds to multiplication in the spatial frequency domain ($I(\vec{k})^- = H(\vec{k}) \times O^-(\vec{k})$). The spatial frequency components of the PSF, known as the optical transfer function (OTF) therefore act as a spatial frequency filter. In order to image small, high-spatial frequency, features in an object, the OTF must contain those spatial frequencies. Super-resolution OTFs have higher-spatial frequencies than are present in diffraction-limited OTFs. This is demonstrated in FIG. 12 where the OTFs for generated SAX PSFs are compared to the diffraction limited OTF at a saturation depth of 2.

Figure 14:
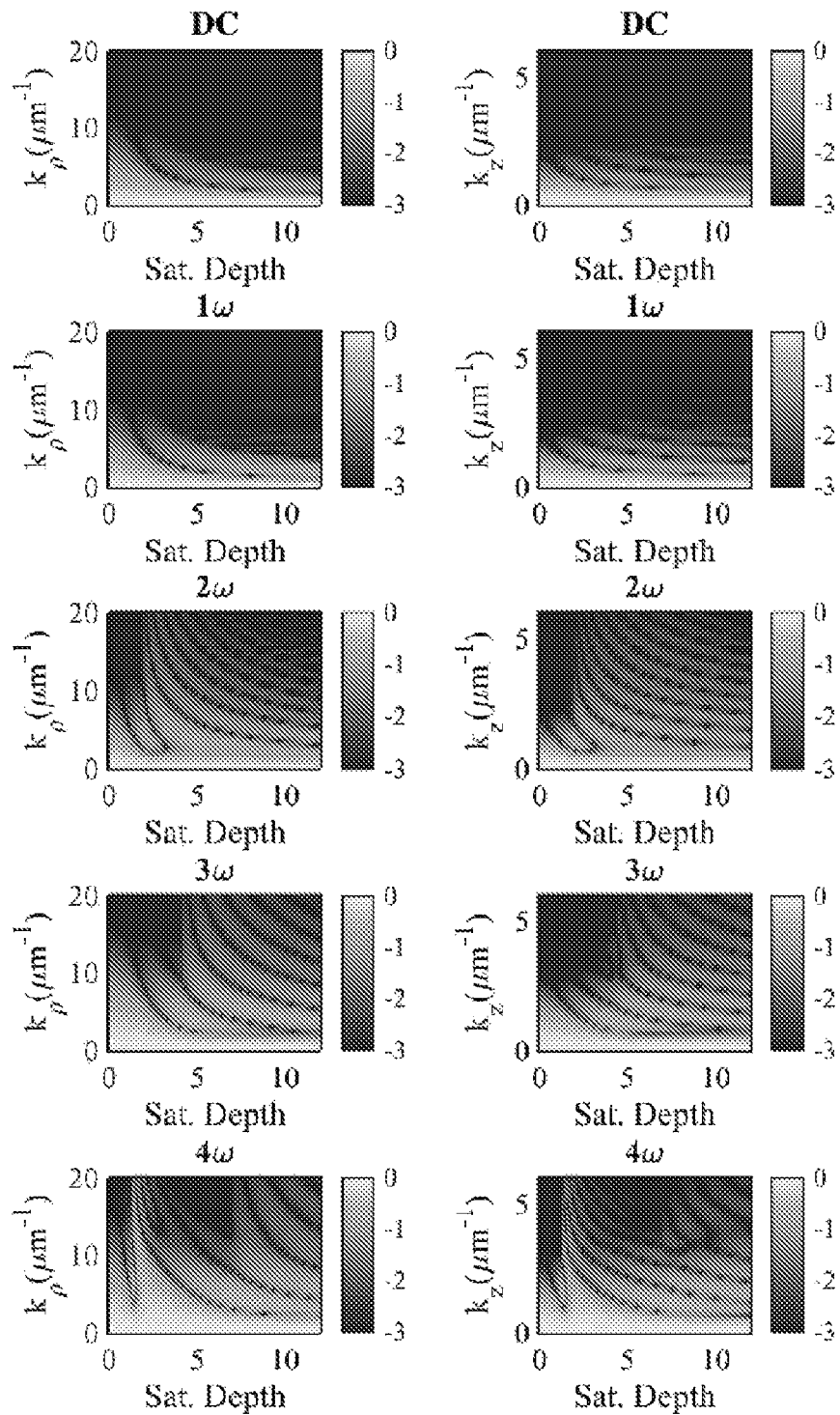
FIG. 14 shows examples of the spatial frequency content of saturated excitation generated PSFs in inverse radical (left) and axial (right) space across saturation depth.

To illustrate MPM SAX performance generally, the log-magnitude of the axial and lateral spectral frequency components are shown versus saturation depth in FIG. 14. At low saturation depth, the DC (0w) OTF contains the spatial frequencies corresponding to a diffraction limited spot. When saturation depth increases, the spatial frequency content in the DC component decreases as expected due to PSF broadening. However, increasing saturation depth creates spatial frequency content in the higher-order SAX OTFs (≥2w) that exceed those available in the diffraction limited case by a factor of >3. Super-resolution can, therefore, be obtained by imaging a sample with several PSFs, each containing different super-resolution spatial frequency content, then combine the resulting images using standard reconstruction techniques.

Figure 15:
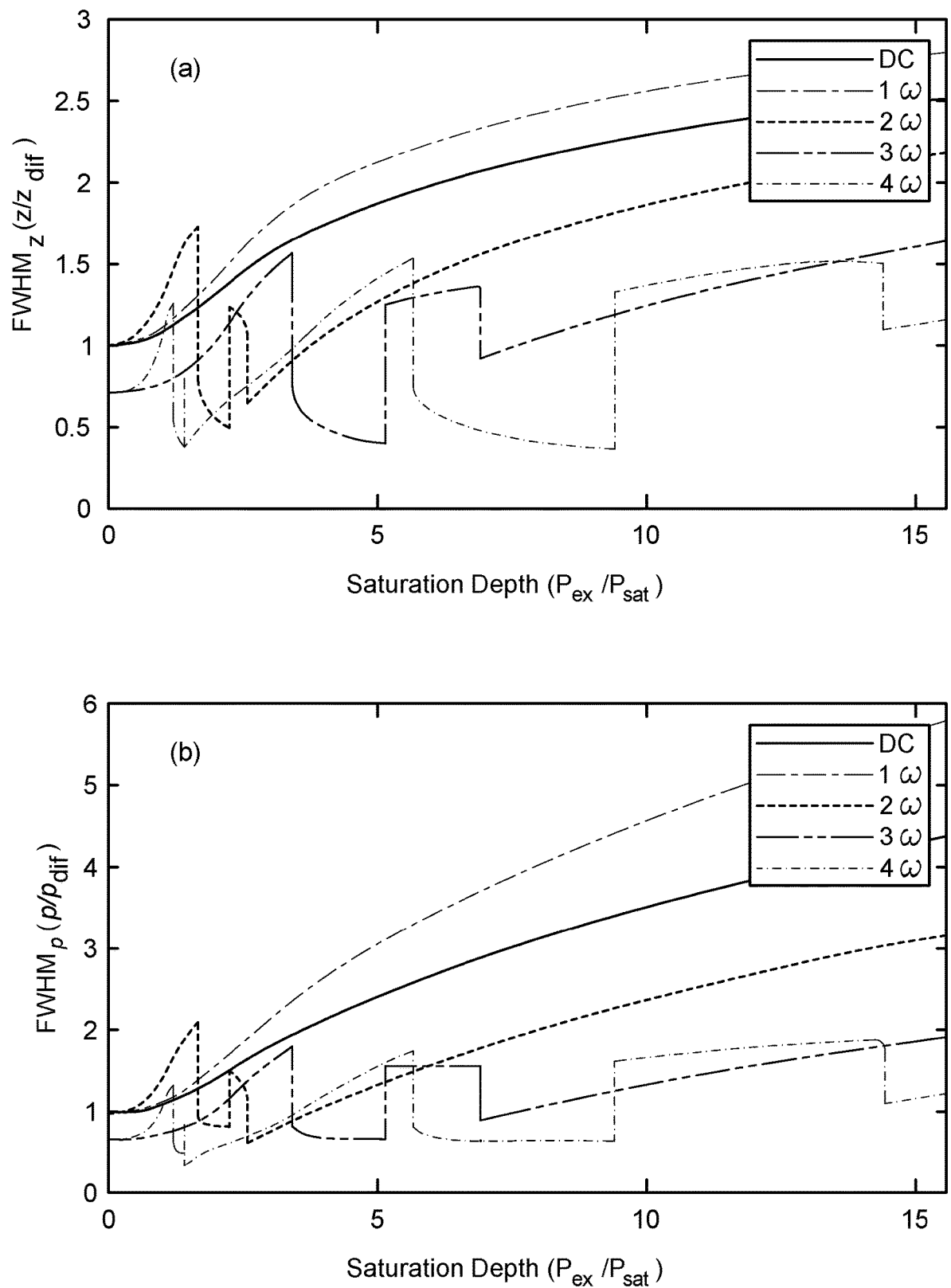
FIG. 15 shows plots of full width half max of saturated excitation PSFs with saturation depth.

Another measure of optical resolution is the full-width halfmax (FWHM) of the PSF. Comparison of MPM SAX PSF FWHM is presented in FIG. 15 as a function of saturation depth. Since many of the PSFs are highly non-Gaussian, measures FWHM does not describe optical resolution performance as completely as the previous discussion of MPM SAX OTFs. Nonetheless, this compact figure allows direct comparison to the diffraction limited FWHM in a compact form. It can be seen that FWHM of saturation PSFs exhibit discontinuities resulting from nodes in the PSF. Even at shallow depth of modulation, sub-diffraction resolution is possible for PSFs corresponding to harmonics ≥3, while unmodulated (DC) MPM exhibits PSF broadening even at low depth of modulation. Further, it can be seen that superresolution PSFs can be generated in all harmonics at specific excitation conditions.

Experimental

The following example illustrates a series of experiments that demonstrate super-sensitivity multiphoton frequency-domain fluorescence lifetime imaging microscopy (MPM-FD-FLIM). The super-sensitivity MPM-FD-FLIM can be achieved through simple modifications to data analysis in a conventional MPM-FD-FLIM microscope, considering the DC components in addition to higher harmonic components ("DC&1w") generated by non-linear optical mixing of modulated excitation light.

Methods

Conventional MPM-FD-FLIM calculates fluorophore lifetime from phase or magnitude measurements of an intensity modulated excitation and emission signal. Because of the nonlinearity of two photon excitation (2PE) fluorescence, the emission is quadratically dependent on the excitation intensity; therefore, the second harmonic (2w) of the modulation frequency is also present in the emission and can be employed to extract lifetime. The nonlinear harmonics of MPM-FD-FLIM are similarly analyzed.

The fluorescence sample is excited by intensity-modulated excitation light, e(t), at an angular frequency of w. The sample generates 2PE fluorescence, p(t). Based on the quadratic nature of the 2PE, p(t) is the convolution of e2(t) and f (t), where f(t)=exp(-t/τ)/τ is the impulse response of the fluorophore, τ is the lifetime, and f(t) is normalized such that its integral on the time domain (t>0) is unity. A mono-exponential fluorescence decay model, which is useful for many fluorophores, is assumed; it can be extended to multi-exponential decay with multiple frequencies of excitation. Because e(t), e²(t), and p(t) are all periodic signals with period T=2π/w, the system can be described with Fourier series. Define Fourier coefficients $$a_k = \frac{1}{T}\int_0^T e^2(t)\exp(-ik\omega t)dt,$$

$$d_k = \frac{1}{T}\int_0^T p(t)\exp(-ik\omega t)dt, k = 0, \pm 1, \pm 2, \cdots.$$

Since p(t)=e²(t)*f(t), using the convolution theorem, we know $d_k = a_k/(1+ikw\tau)$. The 2PE fluorescence signal p(t) is detected by a photomultiplier tube (PMT). The frequency components $d_k$ are extracted by lock-in detection or Fourier analysis. Since p(t) is real, the analysis is simplified by limiting the frequency domain to non-negative frequencies, i.e., k=0, 1, 2, . . . . The real parts of $d_k$, $G_k = \text{Re}\{d_k\}$, is the Fourier cosine transform of p(t); the imaginary part, $S_k = \text{Im}\{d_k\}$, is the Fourier sine transform.

Although a variety of waveforms can be used to modulate the excitation light, in the experimental validation, we only sinusoidal modulation is considered (e(t)=1+m sin(wt), where m is the degree of modulation 0<m≤1). Therefore, $a_0=(m^2+2)/2$, $a_1=-mi$, $a_2=-m^2/4$, and correspondingly, $$G_0 = \frac{m^2+2}{2}, G_1 = -m\frac{\omega\tau}{1+\omega^2\tau^2}, G_2 = -\frac{m^2}{4}\frac{1}{1+4\omega^2\tau^2},$$

$$S_0 = 0, S_1 = -m\frac{1}{1+\omega^2\tau^2}, S_2 = \frac{m^2}{4}\frac{2\omega\tau}{1+4\omega^2\tau^2}.$$

Thus lifetime τ can be solved as a DC&1w method:

$$\tau = \frac{1}{\omega}\sqrt{-\frac{2m}{m^2+2}\frac{G_0}{S_1}-1}.$$

Fluorophore concentration can be accounted for by scaling f(t), which in turn scales the magnitude of each harmonic component by the same value. This yields an important property of FD-FLIM: measurements are self-referencing and do not require knowledge of local concentration as concentration dependence is divided out in the ratios.

To quantify the sensitivity (SNR), the photon economy (F-value) is used as a figure-of-merit. The F-value is defined as the ratio of the uncertainty in lifetime (τ) measurement to the one in intensity (I) measurement with the same amount of detected photons. Smaller F-values indicate improved sensitivity with a shot noise limited minimum of 1.

Figure 16:
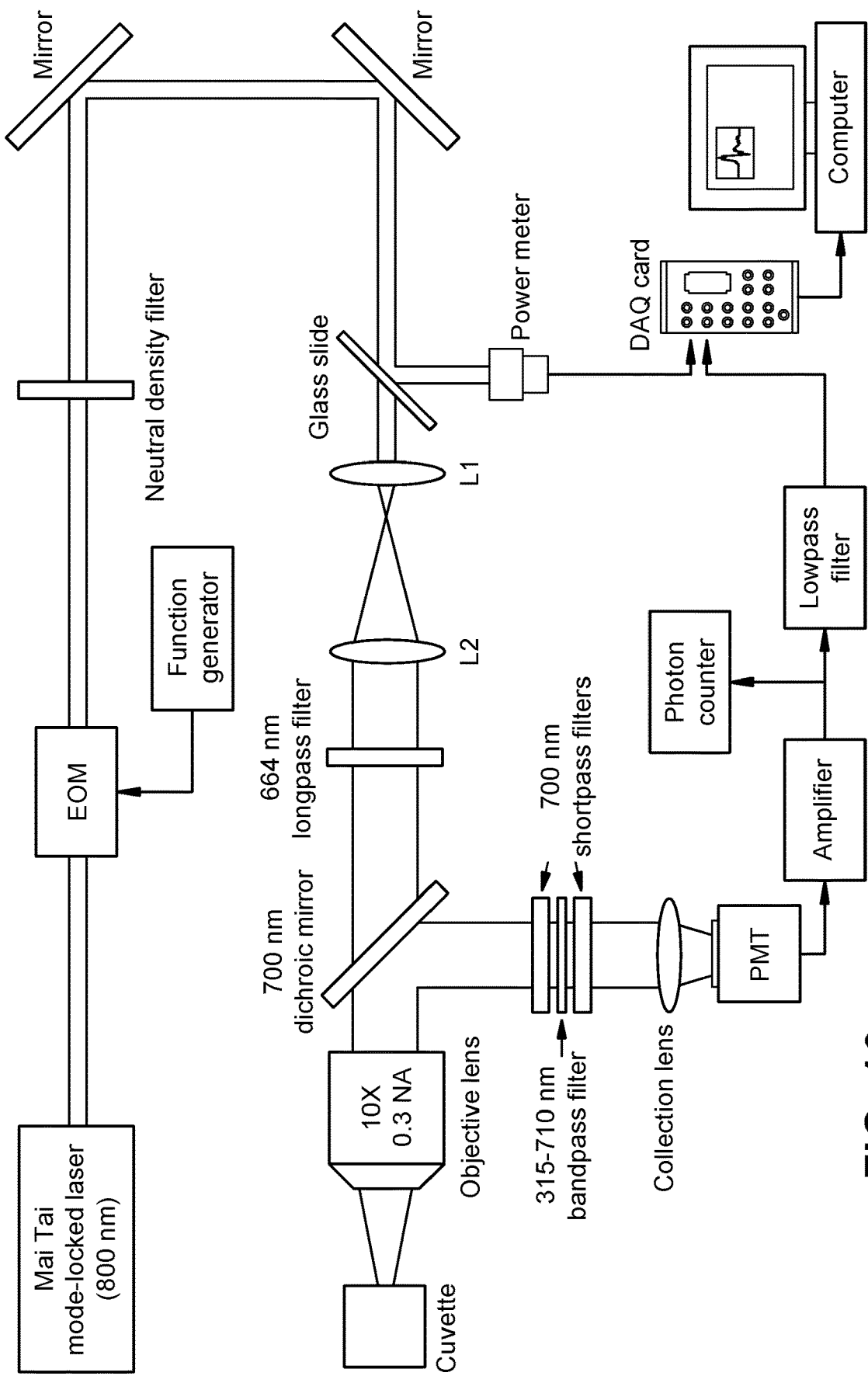
FIG. 16 shows a block diagram illustrating the MPM-FD-FLIM experimental setup.

The MPM-FD-FLIM sensitivity theory validation experiment is depicted in FIG. 16. The intensity of a mode-locked Ti:sapphire laser (Spectra Physics Mai Tai BB, 800 nm, 100 fs, 80 MHz) was modulated by an electro-optic modulator (EOM) (Thorlabs EO-AM-NR-C1) controlled by a function generator. The excitation light was filtered through a long-pass filter to block ambient light from entering the microscope. The excitation beam was expanded by a telescope (L1 and L2) to overfill the back aperture of an objective lens (Zeiss Plan Neofluar, 10×0.3 NA), which created a diffraction-limited spot inside a cuvette. [Ru(dpp)$_3$]$^{2+}$ nanomicelle probe solution in deionized water was used as the sample in the cuvette due to the easy preparation, large two-photon cross-section, and the ability to tune lifetime with dissolved oxygen. The 2PE fluorescence p(t) was epi-collected by the objective lens, reflected by a dichroic mirror, filtered through a set of bandpass and shortpass filters to eliminate residual excitation, and detected by a PMT (Hamamatsu H7422PA-40). The excitation e(t) was monitored by a photodetector (Thorlabs PM100D). Both excitation and emission signals were digitized by a data acquisition card (National Instruments PCI-6110). Lifetime calculations were performed in real time in LabView (National Instruments). The system phase offset was calibrated by measuring and subtracting the phase difference between e(t) and p(t) in a near zero lifetime sample (Rhodamine B, 1000× shorter in lifetime than [Ru(dpp)$_3$]$^{2+}$), or alternatively a reflective surface; the low-frequency system response was calibrated by scaling the DC Fourier component such that the computed lifetimes were consistent. Additionally, a photon counter (Stanford Research Systems SR400) was used to extract the photon number information from the PMT signal in order to calculate the experimental F-values.

It should be noted that while this technique can be applied generally, technical requirements need to be considered for short lifetime fluorophores where required modulation bandwidth exceeds that of an EOM (e.g., NADH, FAD). In such cases, an acousto-optic modulator (AOM) may be preferred. Additionally, when fluorophore lifetime <2 ns, the Dirac pulse train of a mode-locked laser (f=80 MHz) provides an even superior modulation source.

Results
Experimental Validation of the Analytical SNR Model

Figure 17:
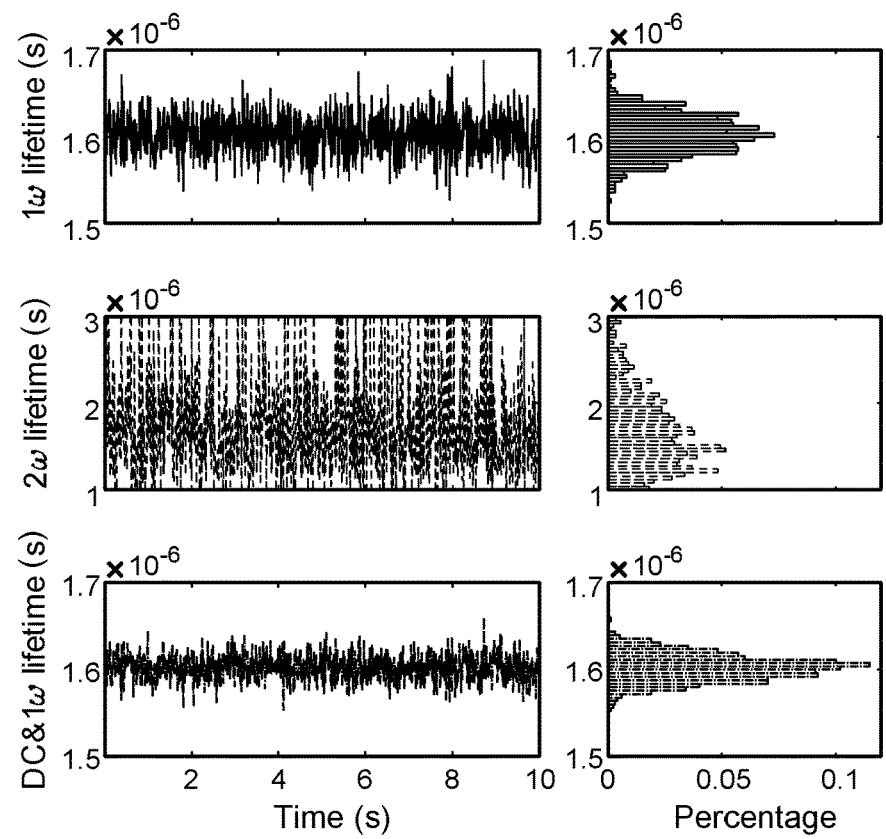
FIG. 17 shows plots comparing experimental results compared to analytical results.
Figure 17:
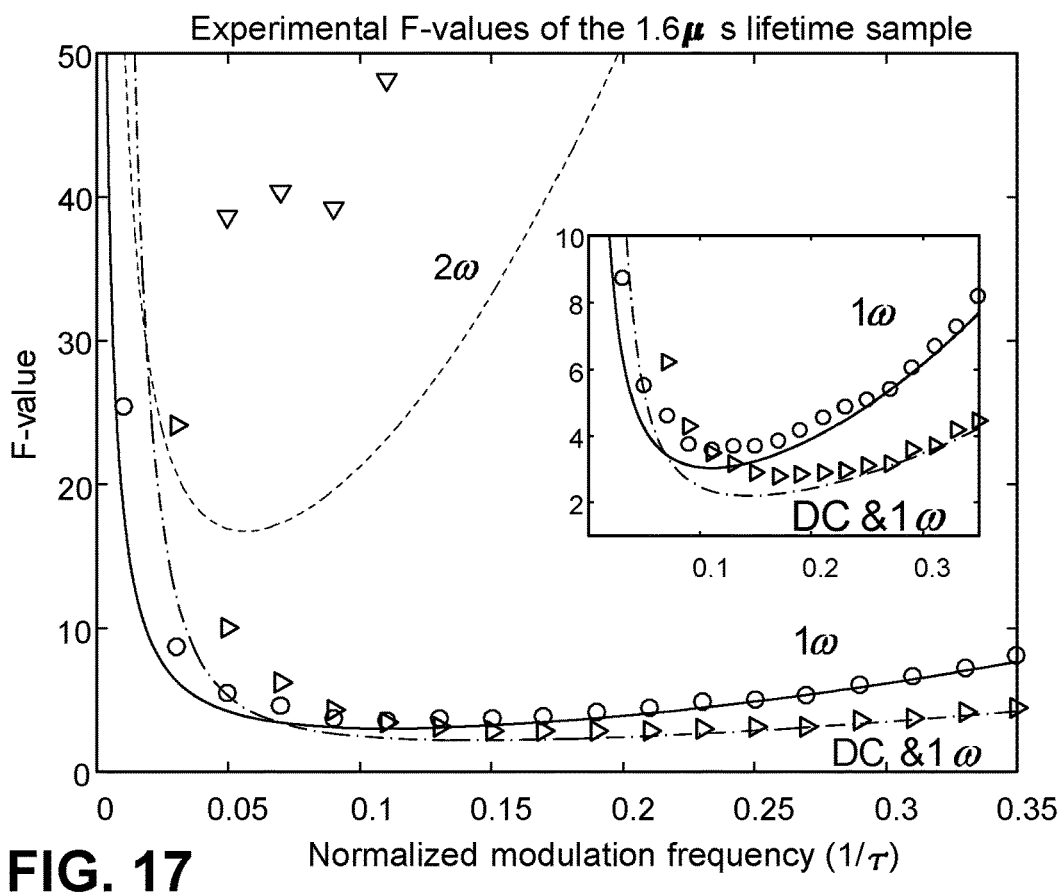

The experimental setup shown in FIG. 16 was used to find the F-values of the traditional phase measurement (1w) and second harmonic phase measurement (2w) MPM-FD-FLIM methods, as well as the inventive DC&1w MPM-FD-FLIM methods as a function of normalized modulation frequencies. The same excitation and emission signal dataset was analyzed using the 1w, 2w, and DC&1w methods. Lifetime was determined from 10 ms of data, and 1000 measurements were obtained for each modulation frequency to obtain means ($\tau$) and standard deviations ($\sigma_\tau$) for each method. Experimental F-values (F=[sq rt (Ndet)] ($\sigma_\tau/\tau$)) were obtained from the means ($\tau$), standard deviations ($\sigma_\tau$), and photon counts during the integration time ($N_{det}$). The [Ru(dpp)$_3$]$^{2+}$ nanomicelle sample was held at a lifetime of 1:6 ms by air saturating the solution and sealing the cuvette. While the modulation frequency varied, the degree of modulation m was kept constant at 0:75. Representative experimental results are shown in FIG. 17(a) for measurements at a modulation frequency of 131:25 kHz (=0:21/$\tau$). Calculated lifetimes and the corresponding histograms show that the DC&1w method has the best sensitivity with a measurement standard deviation of 15 ns, which is clearly smaller than the 1w method (24 ns) and significantly smaller than the 2w method (850 ns).

Photon economy (F-value) versus modulation frequency is presented in FIG. 17(b), where the symbols and curves represent the experimental and analytical theoretical F-values, respectively, to show that DC&1w>1w>>2w.

Sensitivity Comparison Among the 1w, 2w, and DC&1w Methods

The experimental results in FIG. 17(b) show that the modulation frequency of 0:11/$\tau$ is the optimal condition for the 1w method (F=3:62); 0:05/$\tau$ for the 2w method (F=38:69); and 0:17/$\tau$ for the DC&1w method (F=2:81). Thus, each method must be analyzed at its optimal performance condition for a fair comparison. For a [Ru(dpp)$_3$]$^{2+}$ nanomicelle sample with lifetime $\tau$=1:6 μs, modulation frequencies were set at 0:11/$\tau$=68:75 kHz for the 1w method, 0:05/$\tau$=31:25 kHz for the 2w method, and 0:17/$\tau$=106:25 kHz for the DC&1w method. For each of these three experiments, the lifetime measurement relative error ($\sigma_\tau$=$\tau$) was obtained from 1000 individual measurements as a function of integration time.

Figure 18:
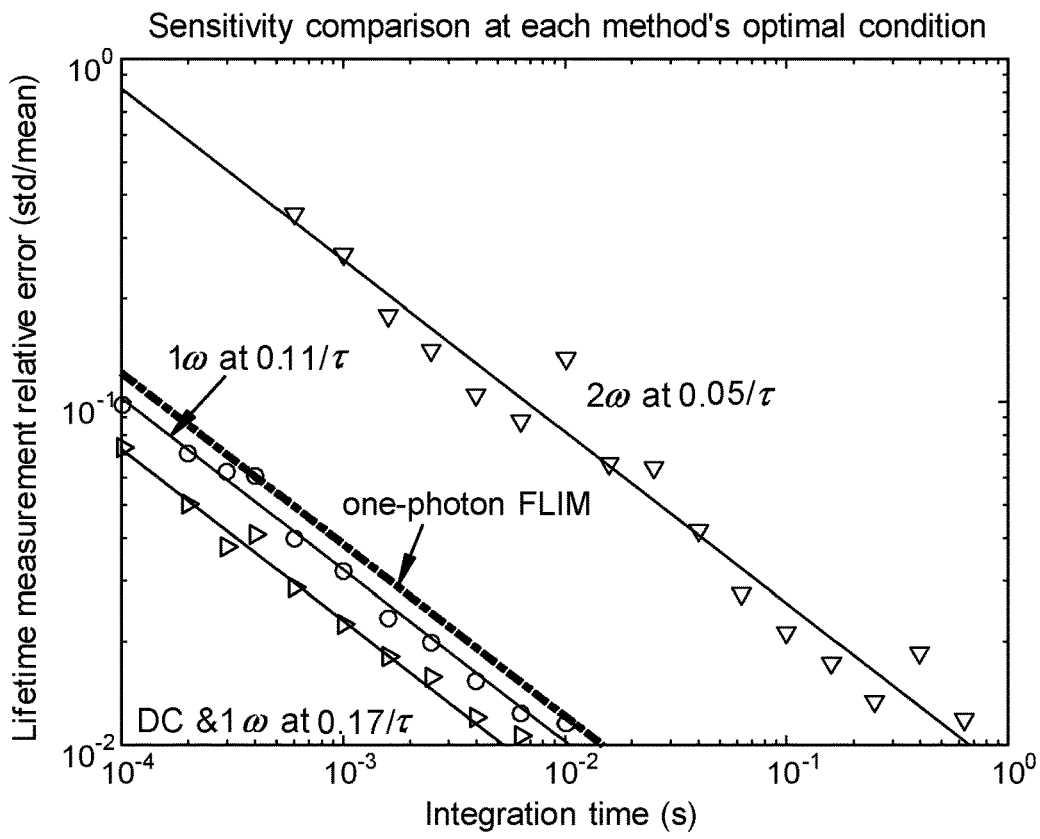
FIG. 18 shows plots of lifetime relative error versus integration time.
Figure 18:
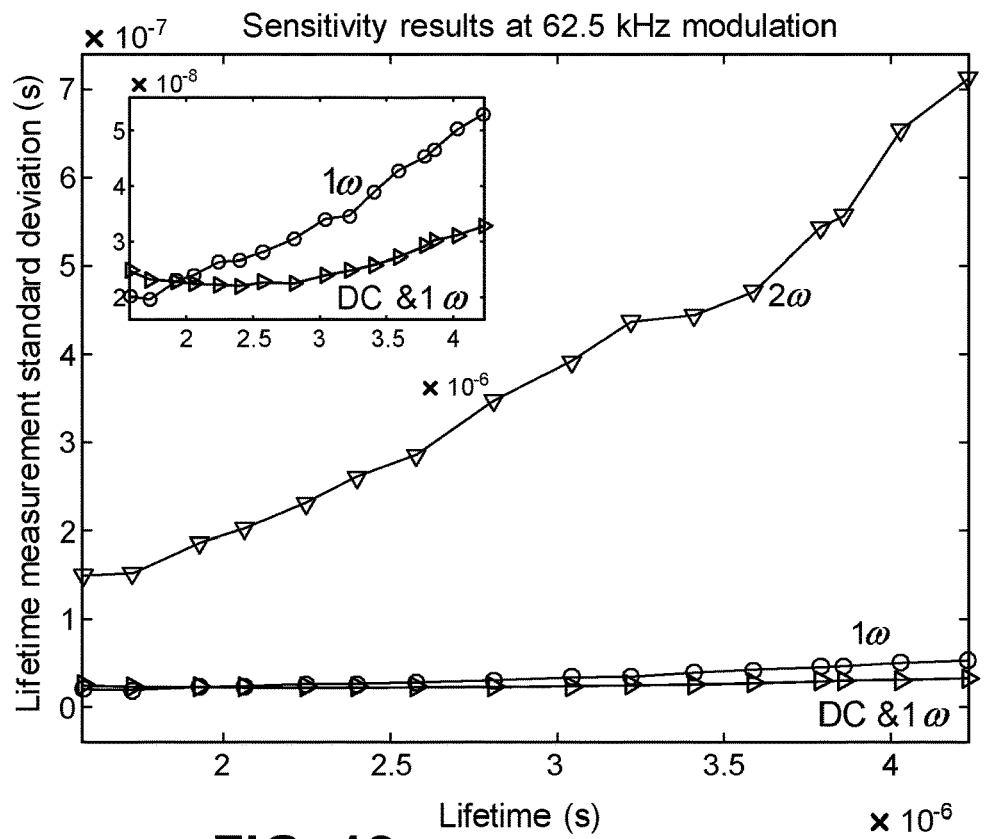

The symbols in FIG. 18(a) plot experimental results; the experimental data are fit to $\sigma_\tau$=$\tau \alpha N_{det}^{-1/2}$ using the nonlinear least squares method. These data illustrate two important results. First, even when measurements are performed at each method's optimal condition, the DC&1w method is superior. For example, for a desired lifetime measurement relative error of 1%, the 1w method requires 10:48 ms, the 2w needs 668 ms, while the DC&1w only requires 5:28 ms. Based on the fits, for any given lifetime relative error, the DC&1w method is 2:0 times as fast as the 1w method, and is 126:5 times as fast as the 2w method. Since the sensitivity of the DC&1w exceeds the optimal sensitivity produced by the conventional 1w MPM-FD-FLIM (i.e., fundamental limit), a super-sensitivity MPM-FD-FLIM can be built. Second, the results show that the photon economies of both the 1w and DC&1w two-photon FD-FLIM exceed the theoretically optimal one-photon FD measurement.

Enhanced MPM-FD-FLIM Lifetime Range

Typically, FD-FLIM measurements of fluorophore lifetimes are limited to narrow range of values since systems have a fixed excitation intensity modulation frequency, f. For example, to maintain F<4, FIG. 17(b) shows that the 1w method is limited to lifetimes of 0:09/f<$\tau$<0:17/f while the DC&1w MPM-FD-FLIM expands this range to 0:11/f<$\tau$<0:31/f. This point was experimentally validated by varying the lifetime of the [Ru(dpp)$_3$]$^{2+}$ nanomicelle probe by slowly pumping nitrogen into the air-saturated solution to change the dissolved oxygen concentration. The modulation frequency was held at 62:5 kHz. The lifetime $\tau$ increased from 1:6 μs to 4:2 μs, corresponding to a normalized modulation frequency of 0:1/$\tau$ to 0:26/$\tau$. For each $\tau$, the 10 ms measurements were repeated for 1000 times and their standard deviations ($\sigma_\tau$) were recorded.

The experimental sensitivity results with respect to different lifetimes are presented in FIG. 3(b). As the $\tau$ varies from 1:6 μs to 4:2 μs, the $\sigma_\tau$ of the 1w method degrades from 19:7 ns to 53:1 ns, while the $\sigma_\tau$ of the DC&1w method stays at a stable level (22:1 ns to 32:8 ns). These results match well with expected F-values in FIG. 17(b). When the normalized modulation frequencies range from 0:1/$\tau$ to 0:26/$\tau$, the F-value of the DC&1w method is flatter compared to the 1w method. This enhanced lifetime range is important since 2D or 3D lifetime images usually span a wide range. The super sensitivity MPM-FD-FLIM using the DC&1w method is capable of keeping a universally high SNR over all pixels, even if there are large lifetime variations.

From the above description, those skilled in the art will perceive improvements, changes and modifications. Such improvements, changes and modifications are within the skill of one in the art and are intended to be covered by the appended claims.

What is claimed is:
1. A system comprising:
   a laser light source to:
      provide excitation light at an intensity;

modulate the intensity of the excitation light according to a periodic function;

deliver the modulated excitation light to a sample, wherein the sample comprises a fluorophore concentration; and saturate the fluorophore concentration of the sample with the modulated excitation light;

a receiver to receive a fluorescence signal emitted from the fluorophore concentration over a time period;

a computing device comprising:

a non-transitory memory storing computer-executable instructions; and a processor that executes the computer-executable instructions to at least:

transform the fluorescence signal to the frequency domain;

measure a fluorescence lifetime associated with the sample in the frequency domain based on a DC component, a first harmonic component and a second harmonic component generated by non-linear optical mixing of the modulated excitation light, wherein the second harmonic component comprises zeroes corresponding to nodes that correspond to an absence of light at specific excitation irradiances; and provide a microscopy image of the sample with an enhanced resolution compared to a traditional multiphoton microscopy image, wherein the enhanced resolution is based on an image rate improved by the DC component improving a signal-to-noise ratio of the microscopy image and recognition of the zeroes enabling at least second harmonic component processing; and a display device to display the microscopy image with the enhanced resolution.

2. The system of claim 1, wherein the enhanced resolution of the microscopy image is enhanced by at least a factor of the square root of two compared to a traditional multiphoton microscopy image.

3. The system of claim 1, wherein the imaging rate is improved by a factor of at least 2 compared to traditional one photon microscopy.

4. The system of claim 1, wherein the imaging rate is improved by a factor of at least 4 compared to traditional multiphoton microscopy.

5. The system of claim 1, wherein the laser light source comprises:

one or more mode-locked lasers to provide the excitation light at the intensity; and a modulator to modulate the intensity of the excitation light according to the periodic function, wherein the modulator comprises at least one of an electro-optic modulator, an acousto-optic modulator, a spatial light modulator, and one or more gratings.

6. The system of claim 1, wherein the receiver comprises a photomultiplier tube to collect the fluorescence signal.

7. The system of claim 6, wherein the receiver further comprises:

a signal processing component comprising at least one of an amplifier and a low pass filter; and an analog-to-digital convertor to create a digital signal based on the fluorescence signal to input to the computing device.

8. The system of claim 1, wherein the fluorescence lifetime associated with the sample in the frequency domain is measured according to at least one of magnitude components and phase components of the DC component, the first harmonic component, and the second harmonic component.

9. The system of claim 1, wherein the excitation light leads to an absorption of at least two photons by the sample.

10. The system of claim 9, wherein the excitation light leads to the absorption of at least three photons by the sample.

11. A method comprising the steps of:

delivering, by one or more laser light sources, excitation light with an intensity modulated by a periodic function to a sample, wherein the sample comprises a fluorophore concentration;

saturating, by the one or more laser light sources, the fluorophore concentration of the sample with the modulated excitation light;

receiving, by a receiver, a fluorescence signal emitted from the fluorophore concentration over a time period;

transforming, by a computing device comprising a processor, the fluorescence signal to the frequency domain;

measuring, by the computing device, a fluorescence lifetime associated with the sample in the frequency domain based on a DC component, a first harmonic component, and a second harmonic component generated by non-linear optical mixing of the modulated excitation light, wherein the second harmonic component comprises zeroes that correspond to nodes that correspond to an absence of light at specific excitation irradiances;

providing, by the computing device, a microscopy image of the sample with an enhanced resolution compared to a traditional multiphoton microscopy image, wherein the enhanced resolution is based on an image rate improved by the DC component improving a signal-to-noise ratio of the microscopy image and the recognition of the zeroes enabling at least second harmonic component processing; and displaying, by a display device associated with the computing device, the microscopy image with the enhanced resolution.

12. The method of claim 11, further comprising converting, by an analog-to-digital converter, the fluorescence signal in the time domain to the frequency domain.

13. The method of claim 11, wherein the imaging rate is improved by a factor of at least 2 compared to traditional one photon microscopy or a factor of at least 4 compared to traditional multiphoton microscopy.

14. The method of claim 11, wherein the enhanced resolution is enhanced by at least a factor of the square root of two compared to a traditional multiphoton microscopy image.

* * * * *